(12) United States Patent
Miao

(10) Patent No.: US 12,035,381 B2
(45) Date of Patent: Jul. 9, 2024

(54) LINK ESTABLISHMENT IN RELAY NODES

(71) Applicant: Apple Inc., Cupertino, CA (US)

(72) Inventor: Honglei Miao, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 170 days.

(21) Appl. No.: 17/431,063

(22) PCT Filed: Mar. 25, 2020

(86) PCT No.: PCT/US2020/024715
§ 371 (c)(1),
(2) Date: Aug. 13, 2021

(87) PCT Pub. No.: WO2020/198357
PCT Pub. Date: Oct. 1, 2020

(65) Prior Publication Data
US 2022/0141890 A1    May 5, 2022

Related U.S. Application Data

(60) Provisional application No. 62/824,171, filed on Mar. 26, 2019.

(51) Int. Cl.
*H04W 76/10*  (2018.01)
*H04W 28/02*  (2009.01)
(Continued)

(52) U.S. Cl.
CPC ....... *H04W 76/10* (2018.02); *H04W 28/0263* (2013.01); *H04W 76/20* (2018.02); *H04W 88/14* (2013.01); *H04W 92/24* (2013.01)

(58) Field of Classification Search
CPC . H04W 76/10; H04W 28/0263; H04W 76/20; H04W 88/14; H04W 92/24; H04W 40/246; H04W 40/22; H04L 45/745
See application file for complete search history.

(56) References Cited

U.S. PATENT DOCUMENTS

2017/0006499 A1  1/2017  Hampel et al.
2019/0029057 A1  1/2019  Pan et al.
(Continued)

FOREIGN PATENT DOCUMENTS

CN   107736004   2/2018
CN   109275177   1/2019
(Continued)

OTHER PUBLICATIONS

Liu et al., "Service Bearer Configuration Method and Apparatus", Oct. 3, 2019, WO, English translation of WO 2019184482. (Year: 2019).*

(Continued)

*Primary Examiner* — Michael K Phillips
(74) *Attorney, Agent, or Firm* — Fish & Richardson P.C.

(57) ABSTRACT

Disclosed are methods, systems, apparatus, and computer programs for establishing a data path between an access node and a donor node of an integrated access and backhaul (IAB) network. In one aspect, a method includes selecting a subset of the plurality of nodes to establish the data path, where the subset of nodes includes the access node and one or more intermediate nodes that link the access node to the donor node, and where the one or more intermediate nodes include a final intermediate node that is coupled to the donor node via a donor-node backhaul bearer, establishing an access link bearer that couples a user equipment (UE) to the access node, establishing respective backhaul link bearers between the subset of nodes, and mapping a final one of the respective backhaul link bearers to the donor-node backhaul link bearer.

18 Claims, 11 Drawing Sheets

(51) Int. Cl.
*H04W 76/20* (2018.01)
*H04W 88/14* (2009.01)
*H04W 92/24* (2009.01)

(56) References Cited

U.S. PATENT DOCUMENTS

| | | | |
|---|---|---|---|
| 2019/0044754 A1 | 2/2019 | Hampel et al. | |
| 2020/0404740 A1* | 12/2020 | Malkamäki | H04W 76/40 |
| 2020/0413457 A1* | 12/2020 | Hong | H04W 76/10 |
| 2021/0014768 A1* | 1/2021 | Hong | H04W 40/22 |
| 2021/0168646 A1* | 6/2021 | Chen | H04W 28/0263 |
| 2021/0227435 A1* | 7/2021 | Hsieh | H04W 36/08 |
| 2021/0243672 A1* | 8/2021 | Deshmukh | H04W 40/12 |
| 2021/0258832 A1* | 8/2021 | Teyeb | H04L 47/24 |
| 2021/0274394 A1* | 9/2021 | Luo | H04W 36/0016 |
| 2021/0315030 A1* | 10/2021 | Teyeb | H04L 61/5076 |
| 2022/0046463 A1* | 2/2022 | Wu | H04W 76/19 |
| 2022/0053588 A1* | 2/2022 | Shaheen | H04W 28/0278 |
| 2022/0141749 A1* | 5/2022 | Luo | H04W 36/0055 |
| | | | 370/331 |
| 2022/0151006 A1* | 5/2022 | Muhammad | H04W 76/19 |

FOREIGN PATENT DOCUMENTS

| | | |
|---|---|---|
| CN | 109302751 | 2/2019 |
| GB | 2581121 | 8/2020 |
| WO | WO 2017034728 | 3/2017 |
| WO | WO 2018063892 | 4/2018 |
| WO | WO-2019184482 A1 * 10/2019 | ........ H04W 72/1263 |

OTHER PUBLICATIONS

3GPP TR 38.874 1.0.0 (Dec. 2018), "3rd Generation Partnership Project; Technical Specification Group Radio Access Network; Study on Integrated Access and Backhaul; (Release 15)," Dec. 2018, 116 pages.

3GPP TS 38.331 V15.0.0 (Dec. 2017), "3rd Generation Partnership Project; Technical Specification Group Radio Access Network; NR; Radio Resource Control (RRC) protocol specification (Release 15)," Dec. 2017, 188 pages.

3GPP TS 38.473 V15.0.0 (Dec. 2017), "3rd Generation Partnership Project; Technical Specification Group Radio Access Network; NG-RAN; F1 application protocol (F1AP) (Release 15)," Dec. 2017, 90 pages.

AT&T, "Mechanisms for resource coordingation and radio-aware scheduling for IAB," 3GPP TSG RAN Wg1 #96, R1-1901894, Athens, Greece, Feb. 25-Mar. 1, 2019, 6 pages.

AT&T, "Radio-aware Scheduling in IAB," 3GPP TSG-RAN WG2 Meeting #105, R2-1902307, Athens, Greece, Feb. 25-Mar. 1, 2019, 5 pages.

PCT International Preliminary Report on Patentability in International Application No. PCT/US2020/024715, dated Sep. 28, 2021, 9 pages.

PCT International Search Report and Written Opinion in International Application No. PCT/US2020/024715, dated Jul. 29, 2020, 17 pages.

Qualcomm Incorporated, "Integrated Access and Backhaul for NR," 3GPP TSG RAN meeting #83, RP-190181, Shenzhen, China, Mar. 18-21, 2019, 22 pages.

Qualcomm, "New WID: Integrated Access and Backhaul for NR," 3GPP TSG RAN WG2, RAN #82, RP-182882, Sorrento, Italy, Dec. 2018, 7 pages.

R2 Vice Chairman (Mediatek), "Report from session on NR UP, IAB WI, NR-U WI, NR IIoT SI," 3GPP TSG-Ran WG2 Meeting #105, R2-1902232, Athens, Greece, Feb. 25-Mar. 1, 2019, 50 pages.

LG Electronics Inc. et al., "Bearer mapping in IAB node," 3GPP TSG-RAN2 Meeting AdHoc#1807, R2-1810808, Montreal, Canada, Jul. 2-6, 2018, 5 pages.

* cited by examiner

LINK ESTABLISHMENT IN RELAY NODES

CLAIM OF PRIORITY

This application claims priority to U.S. Provisional Patent Application No. 62/824,171 filed Mar. 26, 2019, entitled "LINK ESTABLISHMENT IN RELAY NODES," the entirety of which is incorporated herein by reference.

BACKGROUND

User equipment (UE) can wirelessly communicate data using wireless communication networks. To wirelessly communicate data, the UE connects to a node of a radio access network (RAN) and synchronizes with the network.

SUMMARY

The present disclosure is directed towards methods, systems, apparatus, computer programs, or combinations thereof, for establishing user equipment (UE) bearers in new radio (NR) integrated access and backhaul (IAB) networks.

In accordance with one aspect of the present disclosure, a method for establishing a data path between an access IAB node that serves a user equipment (UE) and a donor IAB node in an IAB network is disclosed. The method involves selecting a subset of the plurality of IAB nodes to establish the data path, where the subset of IAB nodes includes the access IAB node and one or more intermediate nodes that link the access node to the donor IAB node, and where the one or more intermediate nodes include a final intermediate node that is communicatively coupled to the donor IAB node via a donor-node backhaul bearer; establishing an access link UE bearer that communicatively couples the UE to the access IAB node; establishing respective backhaul link bearers between the subset of IAB nodes; and mapping a final one of the respective backhaul link bearers to the donor-node backhaul link bearer, thereby establishing the data path between the access IAB node and the donor IAB node.

Other versions include corresponding systems, apparatus, and computer programs to perform the actions of methods defined by instructions encoded on computer readable storage devices. These and other versions may optionally include one or more of the following features.

In some implementations, the respective backhaul link bearers involve 1:1 UE bearer to backhaul link mapping.

In some implementations, mapping a final one of the respective backhaul link bearers to the donor-node backhaul link bearer involves a N:1 UE bearer to backhaul link mapping.

In some implementations, establishing an access link UE bearer that communicatively couples the UE to the access IAB node includes: updating UE context information to include the access link UE bearer; transmitting to the access IAB node an F1 interface control (F1-C) message indicative of the updated UE context information; and transmitting to the UE a configuration message indicative of the updated UE context information.

In some implementations, forwarding, based on the generated routing table, the data packet from the source IAB node to the destination IAB node further includes: generating an adaptation layer header that includes an address of the destination IAB node and a number of the selected numbered local path; and including the adaptation layer header in the data packet.

In some implementations, the configuration message is an RRCReconfiguration message, and the configuration message is transmitted to the UE using radio resource control (RRC) signaling.

In some implementations, the subset of the subset of IAB nodes includes pairs of IAB nodes that have a parent-child relationship, and establishing respective backhaul link bearers between the subset of IAB nodes includes: updating IAB context information of parent IAB nodes of the subset to include the respective backhaul link bearers; transmitting to the parent IAB nodes respective F1 interface control (F1-C) messages indicative of the updated IAB context information; and transmitting to child IAB nodes of the subset a configuration message indicative of the updated UE context information.

In some implementations, the configuration message is an RRCReconfiguration message, and where the configuration message is transmitted to the child IAB nodes using radio resource control (RRC) signaling.

In some implementations, mapping backhaul link bearers to the final backhaul link bearer includes: transmitting to the final IAB node of the subset a configuration message that maps the at least one of the respective backhaul link bearers to the final backhaul link bearer.

In some implementations, the configuration message is an RRCReconfiguration message, and where the configuration message is transmitted to the final IAB node using radio resource control (RRC) signaling.

In some implementations, the final one of the respective backhaul link bearers communicatively couples the final intermediate IAB node to a child IAB node of the final intermediate IAB node.

DESCRIPTION OF DRAWINGS

Like reference numbers and designations in the various drawings indicate like elements.

DETAILED DESCRIPTION

Figure 1:
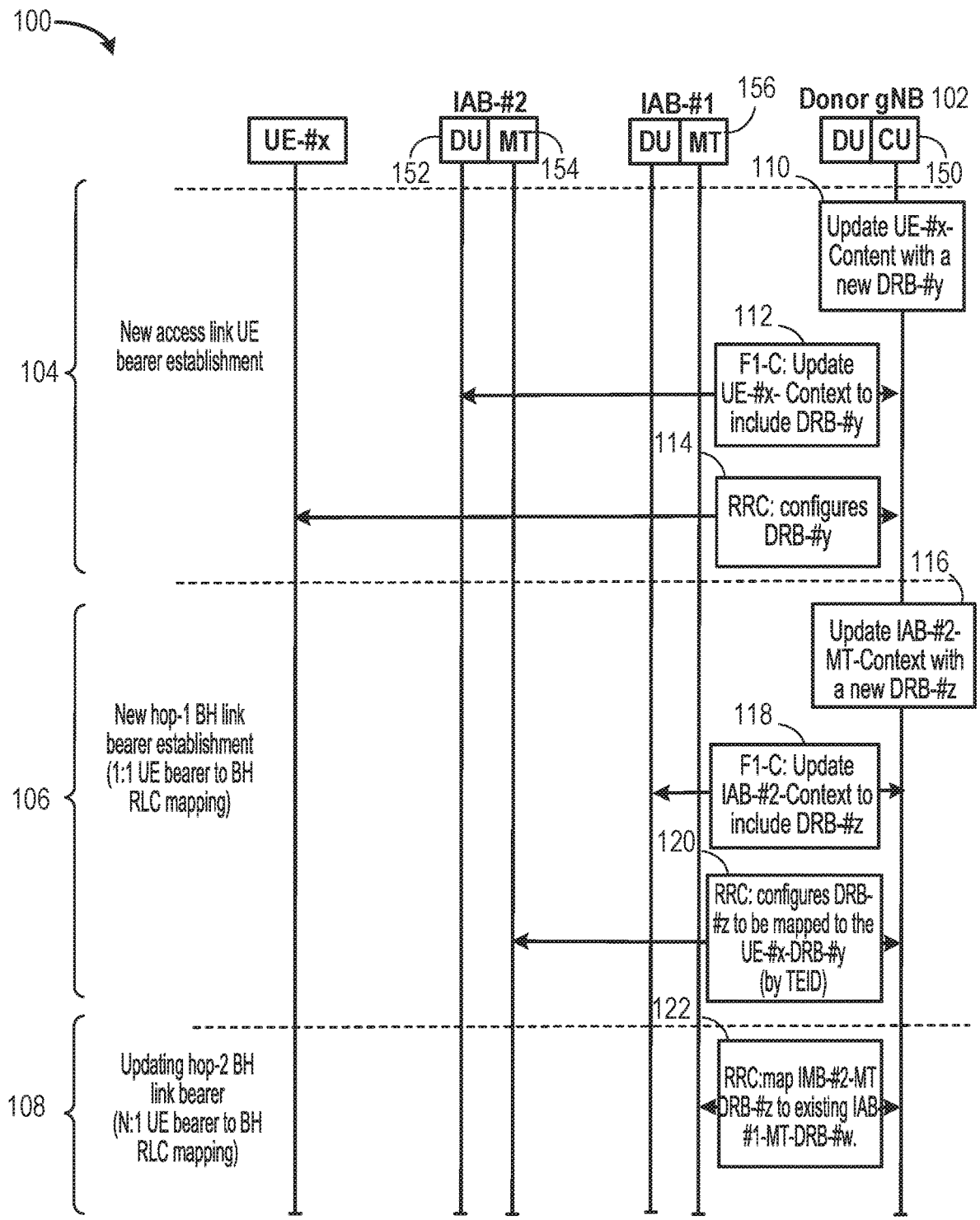
FIG. 1 is an example messaging diagram for establishing a new user equipment (UE) bearer in an integrated access and backhaul (IAB) network, according to some implementations of the present disclosure.

The present disclosure is related to Integrated Access and Backhaul (IAB) networks, which is a feature being designed in 3GPP to enable multi-hop routing. In IAB systems, nodes both serve as access nodes to user equipment (UEs) and provide backhaul links to other IAB nodes. Currently 3GPP Release 16 (Rel-16) is being developed to support IAB networks in new radio systems. Some features of Rel-16 IAB networks may include hop-by-hop automatic repeat request (ARQ) configuration and IP termination at access IAB nodes. Additionally, Rel-16 IAB network may have a network architecture that includes a central unit-distributed unit (CU-DU) split. The CU-DU split is used such that each IAB node holds a DU and a Mobile Termination (MT) function. Generally, an IAB node may use the MT function to connect to its parent IAB node or the donor IAB. And an IAB node may use the DU function to communicate with UEs and MTs of child IAB nodes. The signaling between the MTs of IAB nodes and the CU of the IAB donor uses the RRC protocol. And the signaling between the DU of an IAB node and the CU of the IAB donor uses an F1-AP protocol Some of the features of IAB networks that are being developed are the mapping of UE bearers to backhaul (BH) radio link control (RLC) channels and setup procedures for BH RLC channels. BH RLC channels may be used to transport data packets within the IAB network (e.g., between IAB nodes). The IAB network may support both 1:1 and N:1 UE-bearer-to-BH-RLC-channel mapping. N:1 mapping maps several UE bearers, perhaps using multiplexing, to a single BH RLC channel. Conversely, the 1:1 mapping maps each UE bearer to a separate BH RLC channel. The IAB network may also include a simple model of QoS support that uses N:1 mapping. The selection of QoS enforcement approach may be up to operators to decide based on their specific network implementation and configuration requirements. As such, in IAB networks, all fine-grained QoS may be supported for bearer mapping.

The disclosure describes methods and systems for establishing UE bearer to BH RLC channel mapping in an IAB network. The disclosed methods and systems may provide efficient signaling methods to support both 1:1 and N:1 UE-bearer-to-BH-RLC-channel mapping schemes. Additionally, the disclosed methods and systems may enable UE bearer mapping approaches so that different QoS enforcements can be achieved based on network traffic demands.

In an embodiment, a method for establishing UE bearer to BH RLC channel mapping in an IAB network may involve three phases. In a first phase, the method involves setting up UE dedicated radio bearer (DRB) and radio link control (RLC) channel in an access link and a donor central unit (CU) node. First, the donor CU may update the UE-Context information to include a DRB-#y for the UE-#x. Then, the donor CU may signal to modify the UE-Context information of the access IAB DU to include the new DRB-#y for UE-#x. Specifically, a "UE Context Setup Request" message (from the donor CU to the IAB DU) and "UE Context Setup Response" message (from the IAB DU to the donor CU) may be used to configure the uplink (UL) tunnel endpoint identifier (TEID) and the downlink (DL) TEID, respectively. The donor CU may send an RRCReconfiguration message to the UE-#x to add new DRB-#y, perhaps by using RRC signaling.

In a second phase, the method involves BH DRB setup in intermediate BH links with 1:1 UE-bearer-to-BH-RLC-Channel mapping. In this phase, the method may involve the donor CU updating access IAB-mobile termination (IAB-MT) Context information to include a new DRB-#z for the access IAB-MT. The donor CU then may modify the access IAB-MT-Context information in the intermediate IAB-DU that is the parent node of the access IAB-MT to include new DRB-#z for access IAB-MT. Then, the donor CU may configure a new DRB-#z to access IAB-MT by RRC message, and may map the DRB-#y of UE-#x to the DRB-#z of the access IAB-MT in an adaptation layer.

In a third phase, the method may involve mapping BH RLC channels in intermediate BH links with N:1 UE-bearer-to-BH-RLC-Channel mapping. In this phase, the donor CU may modify the adaptation layer of an intermediate IAB-MT to map the new DRB-#z of access IAB-MT to an existing DRB-#w of the intermediate IAB-MT.

Figure 3:
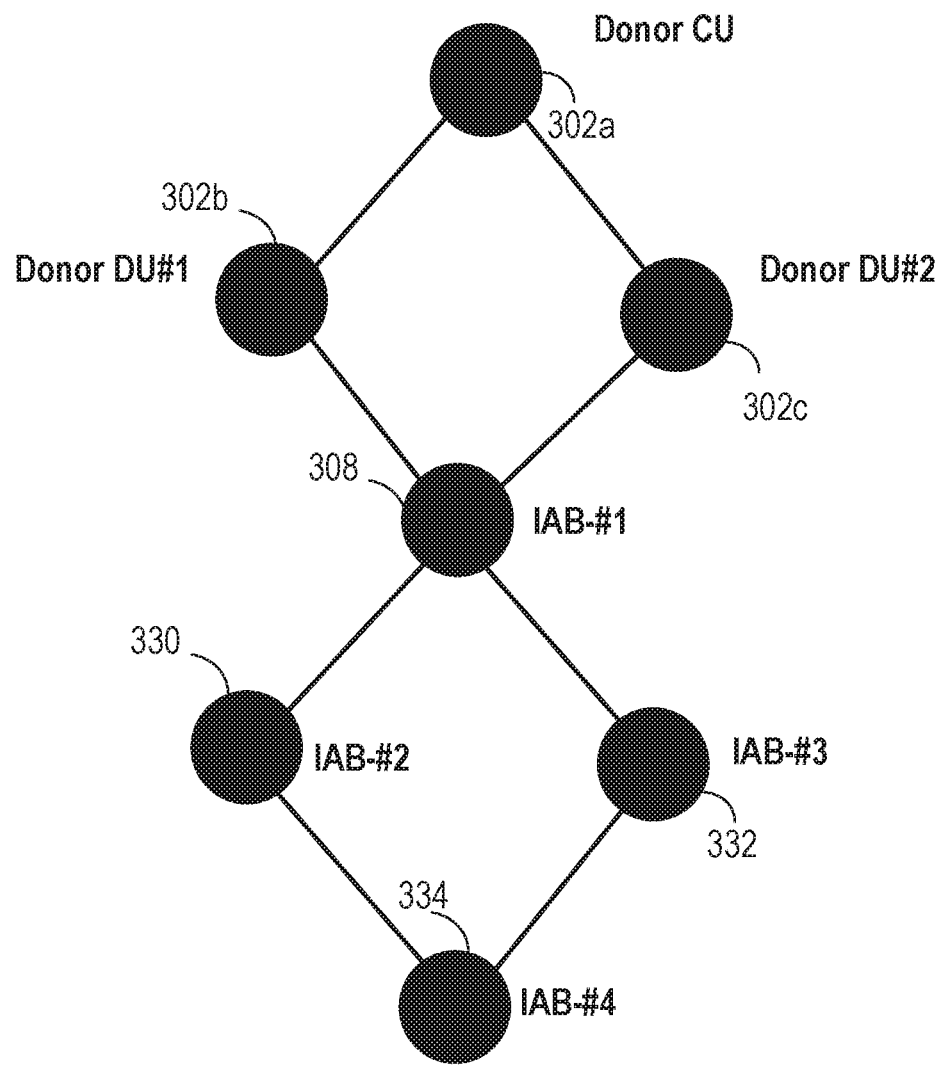
FIG. 3 is an example IAB network, according to some implementations of the present disclosure.

FIG. 1 illustrates an example messaging diagram 100 for establishing a new UE bearer in an IAB network, according to some implementations. In the example of FIG. 1, the IAB network may include donor gNB 102, IAB-#1, IAB-#2, and UE-#x. An example IAB network is illustrated in FIG. 3. As shown in FIG. 1, establishing the new UE bearer (e.g., DRB-#y of UE-#x) may involve three phases: a first phase 104, a second phase 106, and a third phase 108. The new UE bearer may correspond to one or more new QoS flows and/or respective BH RLC channels (e.g., with hybrid 1:1 and N:1 UE bearer-to-BH RLC channel mapping).

The first phase 104 may involve establishing a new access link UE bearer. As shown by step 110, the first phase 104 may involve the donor CU 150 updating the UE-Context information to include a new DRB-#y for UE-#x. Then, in step 112, the first phase 104 may involve the donor CU 150 sending F1-control (F1-C) signaling to the IAB-DU that serves the new UE (i.e., the access IAB-DU) to modify the UE-Context information of the access IAB-DU to include a new DRB for the UE. In the example of FIG. 1, the donor CU 150 sends F1-C signaling to the access IAB-DU of the UE-#x, which is IAB-#2 DU 152, to modify the UE-Context information of the access IAB-DU to include the new DRB-#y for UE-#x. In an example, the signaling may involve the donor CU 150 sending a UE Context Setup Request message to the IAB-#2 DU 152. This message, which is described in Table 1, can be used to configure UL TEID. The signaling may also involve the IAB-#2 DU 152 sending, in response to the message from the donor CU 150, a UE Context Setup Response message to the donor CU 150. This message, which is described in Table 2, can be used to configure DL TEID.

TABLE 1

| | | | | | | | |
|---|---|---|---|---|---|---|---|
| UE Context Setup Request (TEID Setting for UL Data) | | | | | | | |
| IE/Group Name | Presence | Range | IE type and reference | Semantics description | Criticality | Assigned Criticality |
| Message Type | M | | 9.3.1.1 | | YES | reject |
| . . . | | | | | | |
| >>UL UP TNL Information to be setup List | | I | | | | |
| >>>UL UP TNL Information to Be Setup Item IEs | | I . . . <maxnoofULUPTNLInformation> | | | | |
| >>>>UL UP TNL Information | M | | UP Transport Layer Information 9.3.2.1 | gNB-CU endpoint of the F1 transport bearer. For delivery of UL PDUs. | — | — |
| . . . | | | | | | |

TABLE 2

| | | | | | | | |
|---|---|---|---|---|---|---|---|
| UE Context Setup Response (TEID Setting for DL Data) | | | | | | | |
| IE/Group Name | Presence | Range | IE type and reference | Semantics description | Criticality | Assigned Criticality |
| Message Type | M | | 9.3.1.1 | | YES | reject |
| . . . | | | | | | |
| >>DL UP TNL Information to be setup List | | I | | | >>DL UP TNL Information to be setup List | |
| >>> DL UP TNL Information to Be Setup Item IEs | | I . . . <maxnoofDLUPTNLInformation> | | | >>> DL UP TNL Information to Be Setup Item IEs | |
| >>>>DL UP TNL Information | M | | UP Transport Layer Information 9.3.2.1 | gNB-DU endpoint of the F1 transport bearer. For delivery of DL PDUs. | | |
| . . . | | | | | | |

In step 114, the first phase 104 may involve the donor CU 150 sending, using RRC signaling, an RRCReconfiguration message to the UE-#x to add the new DRB-#y. In an example, the RRCReconfiguration message may include the following information elements (IEs):

```
RRCReconfiguration ::=          SEQUENCE {
   rrc-TransactionIdentifier    RRC-TransactionIdentifier,
   criticalExtensions           CHOICE {
      rrcReconfiguration           RRCReconfiguration-IEs,
      criticalExtensionsFuture     SEQUENCE
   }
}
RRCReconfiguration-IEs ::=      SEQUENCE {
   radioBearerConfig               RadioBearerConfig
   ......
}
RadioBearerConfig ::=           SEQUENCE {
   ......
   drb-ToAddModList  DRB-ToAddModList  OPTIONAL, -- Cond HO-
toNR
   ...
```

-continued

```
}
DRB-ToAddModList ::=          SEQUENCE (SIZE (1..maxDRB)) OF DRB-
ToAddMod
DRB-ToAddMod ::=              SEQUENCE {
    ......                    OPTIONAL, -- Cond DRBSetup
    drb-Identity              DRB-Identity (#y),
    ......
}
```

As a result of performing the signaling steps of the first phase 104, a new access RLC with 1:1 UE bearer mapping is established.

The second phase 106 may establish a new hop-1 BH link bearer (e.g., 1:1 UE bearer to BH RLC mapping). Specifically, a new BH DRB is set up in intermediate BH links with 1:1 UE-bearer-to-BH-RLC-Channel mapping. In step 116, the second phase 106 may involve the donor CU 150 updating the IAB-#2-MT-Context information to include a new DRB-#z for IAB-#2 MT 154. Then, in step 118, the second phase 106 may involve the donor CU 150 modifying, using F1-C messages, the IAB-#2-MT-Context information in IAB-#1-DU, which is the parent IAB of the access IAB-#2-MT, to include the new DRB-#z for IAB-#2-MT. In an example, the F1-C messages may be similar to the messages described Table 1 and Table 2. The F1-C messages in this step, however, include IAB-MT ID information that is used to update the TEIDs of BH UL and BH DL, respectively. Table 3 describes the IAB-MT ID indication included in the F1-C messages.

TABLE 3

IAB-MT ID Indication in F1-AP Message

| IE/Group Name | Presence | Range | IE type and reference | Semantics description | Criticality | Assigned Criticality |
|---|---|---|---|---|---|---|
| Message Type | M | | 9.3.1.1 | | YES | reject |
| Donor-CU IAB-MT F1AP ID | M | | 9.3.1.4 | | YES | reject |
| IAB-DU IAB-MT F1AP ID | O | | 9.3.1.5 | | YES | ignore |
| ... | | | | | | |

In step 120, the second phase 106 may involve the donor CU 150 configuring, using an RRC message, a new DRB-#z to access IAB-#2-MT. Additionally, the donor CU 150 may map the DRB-#y of UE-#x to the DRB-#z of the IAB-#2-MT in the adaptation layer.

As a result of performing the signaling steps of the first phase 104, a new BH RLC channel with 1:1 UE-bearer-to-BH-RCL-Channel mapping is established.

The third phase 108 may update hop-2 BH link bearer (e.g., N:1 bearer to BH RLC mapping). Specifically, the third phase 108 may involve reusing an existing BH RLC channel in intermediate BH links with N:1 UE-bearer-to-BH-RLC-Channel mapping. As illustrated in FIG. 1, in step 122, the third phase 108 may involve the donor CU 150 modifying, by an RRC message, the adaptation layer of IAB-#1 MT 156 to map the new DRB-#z of IAB-#2-MT to an existing DRB-#w of IAB-#1-MT. As a result of performing the signaling steps of the third phase 108, the existing BH RLC channel with N:1 UE-bearer-to-BH-RCL-Channel mapping (i.e., IAB-#1-MT-DRB-#w) is established.

Once the three phases of the signaling procedure are completed, a data path is established between UE-#x to donor-CU. This signaling procedure can be employed to create data forwarding path with any combination of different UE-bearer-to-BH-RLC-channel mapping schemes.

Figure 2:
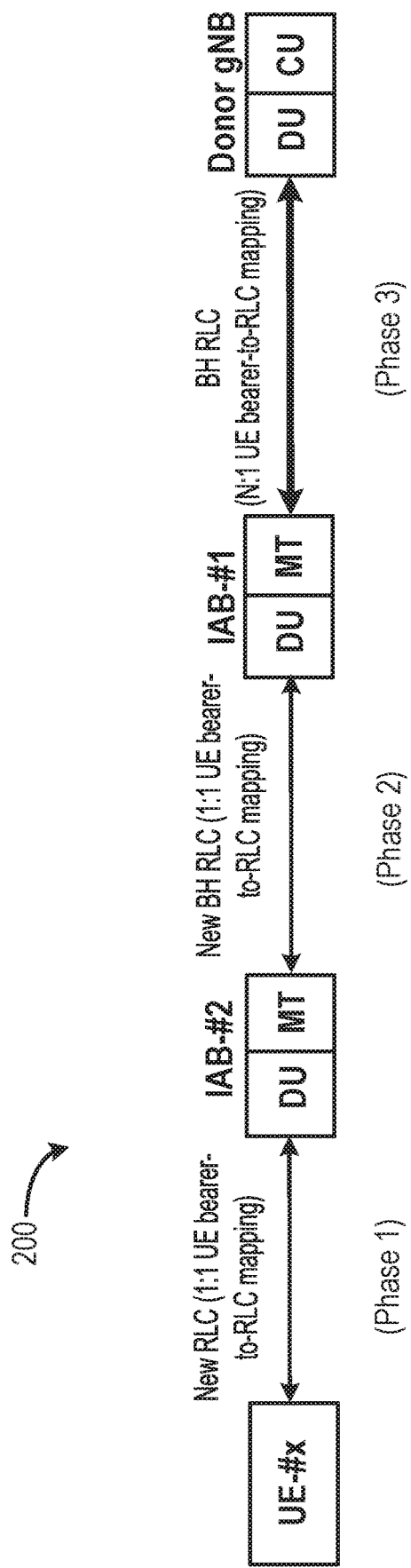
FIG. 2 is a data path established in an IAB network between a UE and donor node, according to some implementations of the present disclosure.

FIG. 2 illustrates a data path that is established in an IAB network as a result of performing the steps of the workflow of FIG. 1, according to some implementations. As shown in FIG. 2, a data path of UE-#x to donor-CU includes 3-hop links. First, the data path includes an access link between the UE-#x and the IAB-#2 DU. As explained above, this link is established by performing the steps of phase one of the disclosed method. Second, the data path includes a hop-1 link between the IAB-#2 MT and the IAB-#1 DU. As explained above, this hop-1 link includes 1:1 UE-bearer-to-BH-RLC-channel mapping and is established by performing the steps of phase 2 of the disclosed method. Third, the data link includes a hop-2 link between the IAB-#1 MT and the donor gNB DU. This hop-2 link has N:1 UE-bearer-to-BH-RLC-Channel mapping and is established by performing the step of phase 3 of the disclosed method.

Note that the example IAB network of FIGS. 1 and 2 includes two children nodes (IAB #1 and IAB #2) under donor gNB 102. The disclosed methods, however, can be applied to an IAB network that includes any number of nodes, such as the IAB network 300 of FIG. 3. In such examples, phase 2 of the disclosed method may involve establishing BH link bearers between any number of intermediate nodes between the access node and the donor gNB node.

FIG. 3 illustrates an example IAB network 300, according to some implementations. As shown in FIG. 3, the IAB network 300 under donor CU 302a includes six children nodes. The six children nodes include two donor DU nodes 302b ("Donor DU #1"), 302c ("Donor DU #2"), and four IAB nodes 308 ("IAB-#1"), 330 ("IAB-#2"), 332 ("IAB-#3"), and 334 ("IAB-#4") that are served by the donor CU 302a. Note that the donor CU 302a and the donor DUs 302b, 302c may be collectively referred to as donor IAB node 302. In this example, IAB-#1 is a parent of IAB-#2 and IAB-#3.

Conversely, IAB-#2 and IAB-#3 are both children of IAB-#1. IAB-#2 and IAB-#3 are both parents of IAB-#4. IAB-#4 is a child of IAB-#2 and IAB-#3. Further, donor IAB node 302 is a parent of IAB-#1.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

Figure 4:
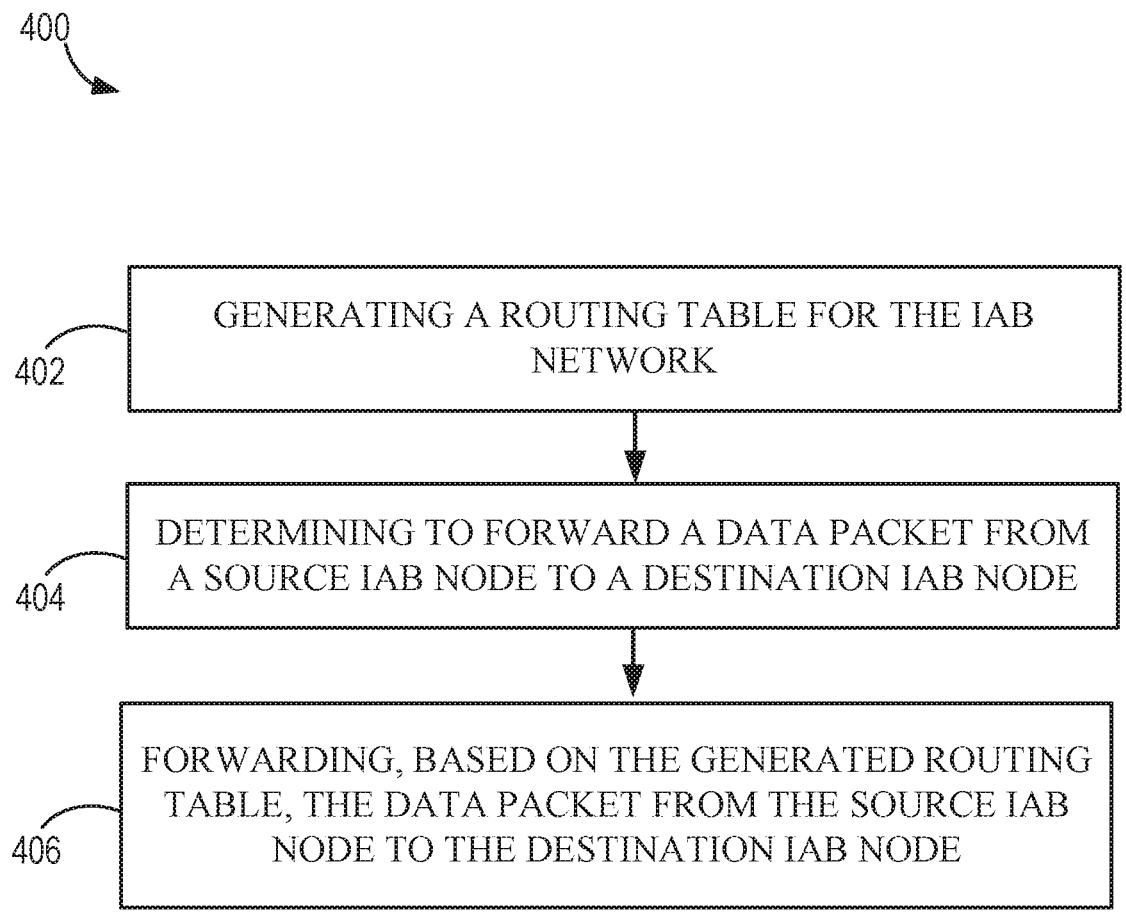
FIG. 4 is a flowchart of an example method, according to some implementations of the present disclosure.

FIG. 4 illustrates a flowchart of an example process 400, according to some implementations. For clarity of presentation, the description that follows generally describes the processes in the context of the other figures in this description. For example, process 400 can be performed by one of the IAB nodes (e.g., donor CU 302) shown in FIG. 3. However, it will be understood that the processes may be performed, for example, by any suitable system, environment, software, and hardware, or a combination of systems, environments, software, and hardware, as appropriate. In some implementations, various steps of the processes can be run in parallel, in combination, in loops, or in any order.

FIG. 4 is a flowchart of an example process 400 for establishing a data path between an access IAB node that serves a UE and a donor IAB node in an IAB network. At step 402, the process involves selecting a subset of the plurality of IAB nodes to establish the data path, where the subset of IAB nodes includes the access IAB node and one or more intermediate nodes that link the access IAB node to the donor IAB node. Further, the one or more intermediate nodes include a final intermediate node that is communicatively coupled to the donor IAB node via a donor-node backhaul bearer.

For example, in FIG. 3, the IAB #4 may be an access node that serves a UE. Applying step 402 to this example may involve selecting a subset of the plurality of IAB nodes to establish the data path between the donor IAB node 302 and the UE. In this example, a subset of the plurality of IAB nodes may be IAB #4, IAB #1, and IAB #2, where IAB #4 is the access IAB node and IAB #1, IAB #2 are intermediate nodes. Further, IAB #1 is the final intermediate node since it connects between the subset of IAB nodes and the donor IAB node.

At step 404, the process involves establishing an access link UE bearer that communicatively couples the UE to the access IAB node. Continuing with the example above, this step establishes an access link UE bearer between the UE and IAB #4.

At step 406, the process involves establishing respective backhaul link bearers between the subset of IAB nodes. Continuing with the example above, this step establishes respective backhaul link bearers between IAB #4, IAB #1, and IAB #2. Specifically, a backhaul link bearer is established between IAB #4 and IAB #2, and between IAB #2 and IAB #1.

At step 408, the process involves mapping a final one of the respective backhaul link bearers to the donor-node backhaul link bearer, thereby establishing the data path between the access IAB node and the donor IAB node. Continuing with the example above, this step involves mapping the backhaul link bearer between IAB #2 and IAB #1 to a donor-node backhaul link bearer between IAB #1 and the donor IAB. The backhaul link bearer between IAB #2 and IAB #1 is the final one of the respective backhaul link bearers because it is the backhaul link bearer between the final intermediate node and its child node.

In some implementations, the respective backhaul link bearers involve 1:1 UE bearer to backhaul link mapping. In some implementations, mapping a final one of the respective backhaul link bearers to the donor-node backhaul link bearer involves a N:1 UE bearer to backhaul link mapping. In some implementations, establishing an access link UE bearer that communicatively couples the UE to the access IAB node includes: updating UE context information to include the access link UE bearer; transmitting to the access IAB node an F1 interface control (F1-C) message indicative of the updated UE context information; and transmitting to the UE a configuration message indicative of the updated UE context information.

In some implementations, forwarding, based on the generated routing table, the data packet from the source IAB node to the destination IAB node further includes: generating an adaptation layer header that includes an address of the destination IAB node and a number of the selected numbered local path; and including the adaptation layer header in the data packet. In some implementations, the configuration message is an RRCReconfiguration message, and the configuration message is transmitted to the UE using radio resource control (RRC) signaling.

In some implementations, the subset of IAB nodes includes pairs of IAB nodes that have a parent-child relationship, and establishing respective backhaul link bearers between the subset of IAB nodes includes: updating IAB context information of parent IAB nodes of the subset to include the respective backhaul link bearers; transmitting to the parent IAB nodes respective F1 interface control (F1-C) messages indicative of the updated IAB context information; and transmitting to child IAB nodes of the subset a configuration message indicative of the updated UE context information. In some implementations, the configuration message is an RRCReconfiguration message, and where the configuration message is transmitted to the child IAB nodes using radio resource control (RRC) signaling.

In some implementations, mapping backhaul link bearers to the final backhaul link bearer includes: transmitting to the final IAB node of the subset a configuration message that maps the at least one of the respective backhaul link bearers to the final backhaul link bearer. In some implementations, the configuration message is an RRCReconfiguration message, and where the configuration message is transmitted to the final IAB node using radio resource control (RRC) signaling. In some implementations, the final one of the respective backhaul link bearers communicatively couples the final intermediate IAB node to a child IAB node of the final intermediate IAB node.

The example process shown in FIG. 4 can be modified or reconfigured to include additional, fewer, or different steps (not shown in FIG. 4), which can be performed in the order shown or in a different order.

Figure 5:
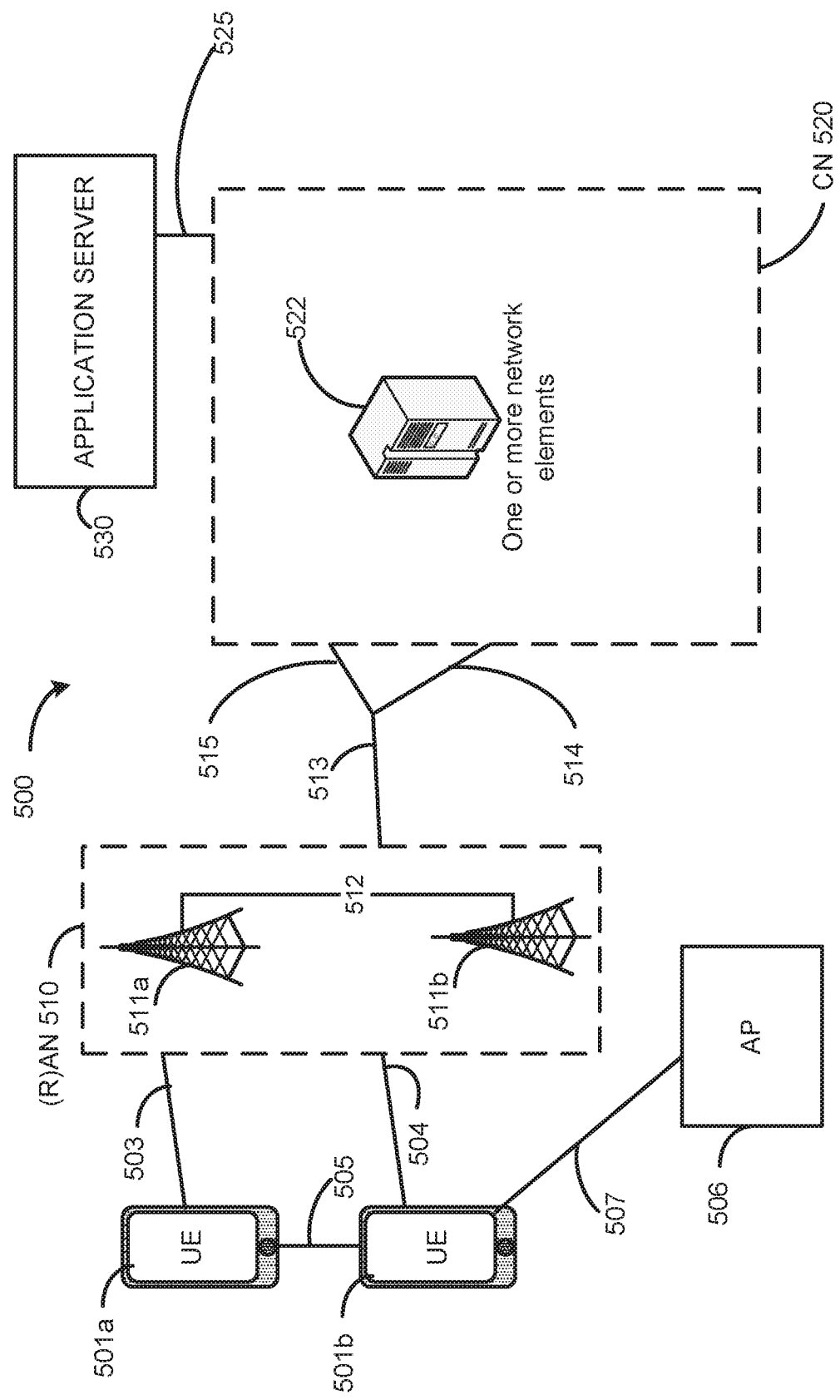
FIG. 5 is an example architecture of a system of a network, according to some implementations of the present disclosure.

FIG. 5 illustrates an example architecture of a system 500 of a network, in accordance with various embodiments. The following description is provided for an example system 500 that operates in conjunction with the LTE system standards and 5G or NR system standards as provided by 3GPP technical specifications. However, the example embodiments are not limited in this regard and the described embodiments may apply to other networks that benefit from the principles described herein, such as future 3GPP systems (e.g., Sixth Generation (6G)) systems, IEEE 802.16 protocols (e.g., WMAN, WiMAX, etc.), or the like.

As shown by FIG. 5, the system 500 includes UE 501*a* and UE 501*b* (collectively referred to as "UEs 501" or "UE 501"). In this example, UEs 501 are illustrated as smartphones (e.g., handheld touchscreen mobile computing devices connectable to one or more cellular networks), but may also comprise any mobile or non-mobile computing device, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, MTC devices M2M, IoT devices, and/or the like.

In some embodiments, any of the UEs 501 may be IoT UEs, which may comprise a network access layer designed for low-power IoT applications utilizing short-lived UE connections. An IoT UE can utilize technologies such as M2M or MTC for exchanging data with an MTC server or device via a PLMN, ProSe or D2D communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 501 may be configured to connect, for example, communicatively couple, with an or RAN 510. In embodiments, the RAN 510 may be an NG RAN or a 5G RAN, an E-UTRAN, or a legacy RAN, such as a UTRAN or GERAN. As used herein, the term "NG RAN" or the like may refer to a RAN 510 that operates in an NR or 5G system 500, and the term "E-UTRAN" or the like may refer to a RAN 510 that operates in an LTE or 4G system 500. The UEs 501 utilize connections (or channels) 503 and 504, respectively, each of which comprises a physical communications interface or layer (discussed in further detail below).

In this example, the connections 503 and 504 are illustrated as an air interface to enable communicative coupling, and can be consistent with cellular communications protocols, such as a GSM protocol, a CDMA network protocol, a PTT protocol, a POC protocol, a UMTS protocol, a 3GPP LTE protocol, a 5G protocol, a NR protocol, and/or any of the other communications protocols discussed herein. In embodiments, the UEs 501 may directly exchange communication data via a ProSe interface 505. The ProSe interface 505 may alternatively be referred to as a SL interface 505 and may comprise one or more logical channels, including but not limited to a PSCCH, a PSCCH, a PSDCH, and a PSBCH.

The UE 501*b* is shown to be configured to access an AP 506 (also referred to as "WLAN node 506," "WLAN 506," "WLAN Termination 506," "WT 506" or the like) via connection 507. The connection 507 can comprise a local wireless connection, such as a connection consistent with any IEEE 802.11 protocol, wherein the AP 506 would comprise a wireless fidelity (Wi-Fi®) router. In this example, the AP 506 is shown to be connected to the Internet without connecting to the core network of the wireless system (described in further detail below). In various embodiments, the UE 501*b*, RAN 510, and AP 506 may be configured to utilize LWA operation and/or LWIP operation. The LWA operation may involve the UE 501*b* in RRC_CONNECTED being configured by a RAN node 511*a-b* to utilize radio resources of LTE and WLAN. LWIP operation may involve the UE 501*b* using WLAN radio resources (e.g., connection 507) via IPsec protocol tunneling to authenticate and encrypt packets (e.g., IP packets) sent over the connection 507. IPsec tunneling may include encapsulating the entirety of original IP packets and adding a new packet header, thereby protecting the original header of the IP packets.

The RAN 510 can include one or more AN nodes or RAN nodes 511*a* and 511*b* (collectively referred to as "RAN nodes 511" or "RAN node 511") that enable the connections 503 and 504. As used herein, the terms "access node," "access point," or the like may describe equipment that provides the radio baseband functions for data and/or voice connectivity between a network and one or more users. These access nodes can be referred to as BS, gNBs, RAN nodes, eNBs, NodeBs, RSUs, TRxPs or TRPs, and so forth, and can comprise ground stations (e.g., terrestrial access points) or satellite stations providing coverage within a geographic area (e.g., a cell). As used herein, the term "NG RAN node" or the like may refer to a RAN node 511 that operates in an NR or 5G system 500 (for example, a gNB), and the term "E-UTRAN node" or the like may refer to a RAN node 511 that operates in an LTE or 4G system 500 (e.g., an eNB). According to various embodiments, the RAN nodes 511 may be implemented as one or more of a dedicated physical device such as a macrocell base station, and/or a low power (LP) base station for providing femtocells, picocells or other like cells having smaller coverage areas, smaller user capacity, or higher bandwidth compared to macrocells.

In some embodiments, all or parts of the RAN nodes 511 may be implemented as one or more software entities running on server computers as part of a virtual network, which may be referred to as a CRAN and/or a virtual baseband unit pool (vBBUP). In these embodiments, the CRAN or vBBUP may implement a RAN function split, such as a PDCP split wherein RRC and PDCP layers are operated by the CRAN/vBBUP and other L2 protocol entities are operated by individual RAN nodes 511; a MAC/PHY split wherein RRC, PDCP, RLC, and MAC layers are operated by the CRAN/vBBUP and the PHY layer is operated by individual RAN nodes 511; or a "lower PHY" split wherein RRC, PDCP, RLC, MAC layers and upper portions of the PHY layer are operated by the CRAN/vBBUP and lower portions of the PHY layer are operated by individual RAN nodes 511. This virtualized framework allows the freed-up processor cores of the RAN nodes 511 to perform other virtualized applications. In some implementations, an individual RAN node 511 may represent individual gNB-DUs that are connected to a gNB-CU via individual F1 interfaces (not shown by FIG. 5). In these implementations, the gNB-DUs may include one or more remote radio heads or RFEMs (see, e.g., FIG. 7), and the gNB-CU may be operated by a server that is located in the RAN 510 (not shown) or by a server pool in a similar manner as the CRAN/vBBUP. Additionally or alternatively, one or more of the RAN nodes 511 may be next generation eNBs (ng-eNBs), which are RAN nodes that provide E-UTRA user plane and control plane protocol terminations toward the UEs 501, and are connected to a 5GC via an NG interface (discussed infra).

In V2X scenarios one or more of the RAN nodes 511 may be or act as RSUs. The term "Road Side Unit" or "RSU" may refer to any transportation infrastructure entity used for V2X communications. An RSU may be implemented in or by a suitable RAN node or a stationary (or relatively stationary) UE, where an RSU implemented in or by a UE may be referred to as a "UE-type RSU," an RSU implemented in or by an eNB may be referred to as an "eNB-type RSU," an RSU implemented in or by a gNB may be referred to as a "gNB-type RSU," and the like. In one example, an RSU is a computing device coupled with radio frequency circuitry located on a roadside that provides connectivity support to passing vehicle UEs 501 (vUEs 501). The RSU may also include internal data storage circuitry to store intersection map geometry, traffic statistics, media, as well as applications/software to sense and control ongoing vehicular and pedestrian traffic. The RSU may operate on the 5.9 GHz Direct Short Range Communications (DSRC) band to provide very low latency communications required for high speed events, such as crash avoidance, traffic warnings, and the like. Additionally or alternatively, the RSU may operate on the cellular V2X band to provide the aforementioned low latency communications, as well as other cellular communications services. Additionally or alternatively, the RSU may operate as a Wi-Fi hotspot (2.4 GHz band) and/or provide connectivity to one or more cellular networks to provide uplink and downlink communications. The computing device(s) and some or all of the radiofrequency circuitry of the RSU may be packaged in a weatherproof enclosure suitable for outdoor installation, and may include a network interface controller to provide a wired connection (e.g., Ethernet) to a traffic signal controller and/or a backhaul network.

Any of the RAN nodes 511 can terminate the air interface protocol and can be the first point of contact for the UEs 501. In some embodiments, any of the RAN nodes 511 can fulfill various logical functions for the RAN 510 including, but not limited to, radio network controller (RNC) functions such as radio bearer management, uplink and downlink dynamic radio resource management and data packet scheduling, and mobility management.

In embodiments, the UEs 501 can be configured to communicate using OFDM communication signals with each other or with any of the RAN nodes 511 over a multicarrier communication channel in accordance with various communication techniques, such as, but not limited to, an OFDMA communication technique (e.g., for downlink communications) or a SC-FDMA communication technique (e.g., for uplink and ProSe or sidelink communications); although the scope of the embodiments is not limited in this respect. The OFDM signals can comprise a plurality of orthogonal subcarriers.

In some embodiments, a downlink resource grid can be used for downlink transmissions from any of the RAN nodes 511 to the UEs 501, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

According to various embodiments, the UEs 501 and the RAN nodes 511 communicate data (for example, transmit and receive) data over a licensed medium (also referred to as the "licensed spectrum" and/or the "licensed band") and an unlicensed shared medium (also referred to as the "unlicensed spectrum" and/or the "unlicensed band"). The licensed spectrum may include channels that operate in the frequency range of approximately 400 MHz to approximately 3.8 GHz, whereas the unlicensed spectrum may include the 5 GHz band.

To operate in the unlicensed spectrum, the UEs 501 and the RAN nodes 511 may operate using LAA, eLAA, and/or feLAA mechanisms. In these implementations, the UEs 501 and the RAN nodes 511 may perform one or more known medium-sensing operations and/or carrier-sensing operations in order to determine whether one or more channels in the unlicensed spectrum is unavailable or otherwise occupied prior to transmitting in the unlicensed spectrum. The medium/carrier sensing operations may be performed according to a listen-before-talk (LBT) protocol.

LBT is a mechanism whereby equipment (for example, UEs 501 RAN nodes 511, etc.) senses a medium (for example, a channel or carrier frequency) and transmits when the medium is sensed to be idle (or when a specific channel in the medium is sensed to be unoccupied). The medium sensing operation may include CCA, which utilizes at least ED to determine the presence or absence of other signals on a channel in order to determine if a channel is occupied or clear. This LBT mechanism allows cellular/LAA networks to coexist with incumbent systems in the unlicensed spectrum and with other LAA networks. ED may include sensing RF energy across an intended transmission band for a period of time and comparing the sensed RF energy to a predefined or configured threshold.

Typically, the incumbent systems in the 5 GHz band are WLANs based on IEEE 802.11 technologies. WLAN employs a contention-based channel access mechanism, called CSMA/CA. Here, when a WLAN node (e.g., a mobile station (MS) such as UE 501, AP 506, or the like) intends to transmit, the WLAN node may first perform CCA before transmission. Additionally, a backoff mechanism is used to avoid collisions in situations where more than one WLAN node senses the channel as idle and transmits at the same time. The backoff mechanism may be a counter that is drawn randomly within the CWS, which is increased exponentially upon the occurrence of collision and reset to a minimum value when the transmission succeeds. The LBT mechanism designed for LAA is somewhat similar to the CSMA/CA of WLAN. In some implementations, the LBT procedure for DL or UL transmission bursts including PDSCH or PUSCH transmissions, respectively, may have an LAA contention window that is variable in length between X and Y ECCA slots, where X and Y are minimum and maximum values for the CWSs for LAA. In one example, the minimum CWS for an LAA transmission may be 9 microseconds (µs); however, the size of the CWS and a MCOT (for example, a transmission burst) may be based on governmental regulatory requirements.

The LAA mechanisms are built upon CA technologies of LTE-Advanced systems. In CA, each aggregated carrier is referred to as a CC. A CC may have a bandwidth of 1.4, 3, 5, 10, 15 or 20 MHz and a maximum of five CCs can be aggregated, and therefore, a maximum aggregated bandwidth is 100 MHz. In FDD systems, the number of aggregated carriers can be different for DL and UL, where the number of UL CCs is equal to or lower than the number of DL component carriers. In some cases, individual CCs can have a different bandwidth than other CCs. In TDD systems, the number of CCs as well as the bandwidths of each CC is usually the same for DL and UL.

CA also comprises individual serving cells to provide individual CCs. The coverage of the serving cells may differ, for example, because CCs on different frequency bands will experience different pathloss. A primary service cell or PCell may provide a PCC for both UL and DL, and may handle RRC and NAS related activities. The other serving cells are referred to as SCells, and each SCell may provide an individual SCC for both UL and DL. The SCCs may be added and removed as required, while changing the PCC may require the UE 501 to undergo a handover. In LAA, eLAA, and feLAA, some or all of the SCells may operate in the unlicensed spectrum (referred to as "LAA SCells"), and the LAA SCells are assisted by a PCell operating in the licensed spectrum. When a UE is configured with more than one LAA SCell, the UE may receive UL grants on the configured LAA SCells indicating different PUSCH starting positions within a same subframe.

The PDSCH carries user data and higher-layer signaling to the UEs 501. The PDCCH carries information about the transport format and resource allocations related to the PDSCH channel, among other things. It may also inform the UEs 501 about the transport format, resource allocation, and HARQ information related to the uplink shared channel. Typically, downlink scheduling (assigning control and shared channel resource blocks to the UE 501b within a cell) may be performed at any of the RAN nodes 511 based on channel quality information fed back from any of the UEs 501. The downlink resource assignment information may be sent on the PDCCH used for (e.g., assigned to) each of the UEs 501.

The PDCCH uses CCEs to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known REGs. Four Quadrature Phase Shift Keying (QPSK) symbols may be mapped to each REG. The PDCCH can be transmitted using one or more CCEs, depending on the size of the DCI and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an EPDCCH that uses PDSCH resources for control information transmission. The EPDCCH may be transmitted using one or more ECCEs. Similar to above, each ECCE may correspond to nine sets of four physical resource elements known as an EREGs. An ECCE may have other numbers of EREGs in some situations.

The RAN nodes 511 may be configured to communicate with one another via interface 512. In embodiments where the system 500 is an LTE system (e.g., when CN 520 is an EPC 620 as in FIG. 6), the interface 512 may be an X2 interface 512. The X2 interface may be defined between two or more RAN nodes 511 (e.g., two or more eNBs and the like) that connect to EPC 520, and/or between two eNBs connecting to EPC 520. In some implementations, the X2 interface may include an X2 user plane interface (X2-U) and an X2 control plane interface (X2-C). The X2-U may provide flow control mechanisms for user data packets transferred over the X2 interface, and may be used to communicate information about the delivery of user data between eNBs. For example, the X2-U may provide specific sequence number information for user data transferred from a MeNB to an SeNB; information about successful in sequence delivery of PDCP PDUs to a UE 501 from an SeNB for user data; information of PDCP PDUs that were not delivered to a UE 501; information about a current minimum desired buffer size at the SeNB for transmitting to the UE user data; and the like. The X2-C may provide intra-LTE access mobility functionality, including context transfers from source to target eNBs, user plane transport control, etc.; load management functionality; as well as inter-cell interference coordination functionality.

In embodiments where the system 500 is a 5G or NR system, the interface 512 may be an Xn interface 512. The Xn interface is defined between two or more RAN nodes 511 (e.g., two or more gNBs and the like) that connect to 5GC 520, between a RAN node 511 (e.g., a gNB) connecting to 5GC 520 and an eNB, and/or between two eNBs connecting to 5GC 520. In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for UE 501 in a connected mode (e.g., CM-CONNECTED) including functionality to manage the UE mobility for connected mode between one or more RAN nodes 511. The mobility support may include context transfer from an old (source) serving RAN node 511 to new (target) serving RAN node 511; and control of user plane tunnels between old (source) serving RAN node 511 to new (target) serving RAN node 511. A protocol stack of the Xn-U may include a transport network layer built on Internet Protocol (IP) transport layer, and a GTP-U layer on top of a UDP and/or IP layer(s) to carry user plane PDUs. The Xn-C protocol stack may include an application layer signaling protocol (referred to as Xn Application Protocol (Xn-AP)) and a transport network layer that is built on SCTP. The SCTP may be on top of an IP layer, and may provide the guaranteed delivery of application layer messages. In the transport IP layer, point-to-point transmission is used to deliver the signaling PDUs. In other implementations, the Xn-U protocol stack and/or the Xn-C protocol stack may be same or similar to the user plane and/or control plane protocol stack(s) shown and described herein.

The RAN 510 is shown to be communicatively coupled to a core network—in this embodiment, core network (CN) 520. The CN 520 may comprise a plurality of network elements 522, which are configured to offer various data and telecommunications services to customers/subscribers (e.g., users of UEs 501) who are connected to the CN 520 via the RAN 510. The components of the CN 520 may be implemented in one physical node or separate physical nodes including components to read and execute instructions from a machine-readable or computer-readable medium (e.g., a non-transitory machine-readable storage medium). In some embodiments, NFV may be utilized to virtualize any or all of the above-described network node functions via executable instructions stored in one or more computer-readable storage mediums (described in further detail below). A logical instantiation of the CN 520 may be referred to as a network slice, and a logical instantiation of a portion of the CN 520 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Generally, the application server 530 may be an element offering applications that use IP bearer resources with the core network (e.g., UMTS PS domain, LTE PS data services, etc.). The application server 530 can also be configured to support one or more communication services (e.g., VoIP sessions, PTT sessions, group communication sessions, social networking services, etc.) for the UEs 501 via the EPC 520.

In embodiments, the CN 520 may be a 5GC (referred to as "5GC 520" or the like), and the RAN 510 may be connected with the CN 520 via an NG interface 513. In embodiments, the NG interface 513 may be split into two parts, an NG user plane (NG-U) interface 514, which carries traffic data between the RAN nodes 511 and a UPF, and the S1 control plane (NG-C) interface 515, which is a signaling interface between the RAN nodes 511 and AMFs.

In embodiments, the CN 520 may be a 5G CN (referred to as "5GC 520" or the like), while in other embodiments, the CN 520 may be an EPC). Where CN 520 is an EPC (referred to as "EPC 520" or the like), the RAN 510 may be connected with the CN 520 via an S1 interface 513. In embodiments, the S1 interface 513 may be split into two parts, an S1 user plane (S1-U) interface 514, which carries traffic data between the RAN nodes 511 and the S-GW, and the S1-MME interface 515, which is a signaling interface between the RAN nodes 511 and MMEs.

Figure 6:
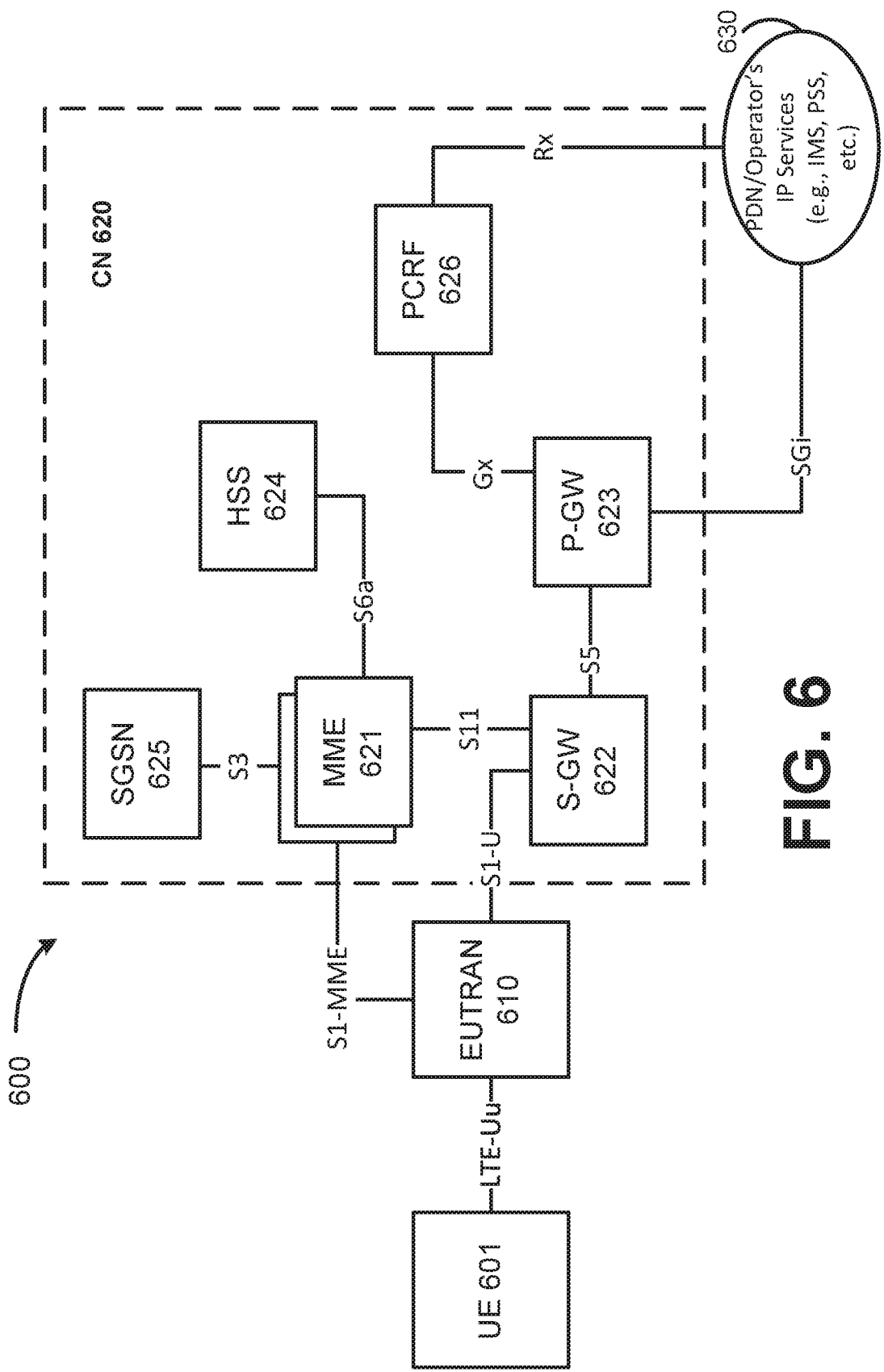
FIG. 6 is an example architecture of a system including a CN, according to some implementations of the present disclosure.

FIG. 6 illustrates an example architecture of a system 600 including a first CN 620, in accordance with various embodiments. In this example, system 600 may implement the LTE standard wherein the CN 620 is an EPC 620 that corresponds with CN 520 of FIG. 5. Additionally, the UE 601 may be the same or similar as the UEs 501 of FIG. 5, and the E-UTRAN 610 may be a RAN that is the same or similar to the RAN 510 of FIG. 5, and which may include RAN nodes 511 discussed previously. The CN 620 may comprise MMEs 621, an S-GW 622, a P-GW 623, a HSS 624, and a SGSN 625.

The MMEs 621 may be similar in function to the control plane of legacy SGSN, and may implement MM functions to keep track of the current location of a UE 601. The MMEs 621 may perform various MM procedures to manage mobility aspects in access such as gateway selection and tracking area list management. MM (also referred to as "EPS MM" or "EMM" in E-UTRAN systems) may refer to all applicable procedures, methods, data storage, etc. that are used to maintain knowledge about a present location of the UE 601, provide user identity confidentiality, and/or perform other like services to users/subscribers. Each UE 601 and the MME 621 may include an MM or EMM sublayer, and an MM context may be established in the UE 601 and the MME 621 when an attach procedure is successfully completed. The MM context may be a data structure or database object that stores MM-related information of the UE 601. The MMEs 621 may be coupled with the HSS 624 via an S6a reference point, coupled with the SGSN 625 via an S3 reference point, and coupled with the S-GW 622 via an S11 reference point.

The SGSN 625 may be a node that serves the UE 601 by tracking the location of an individual UE 601 and performing security functions. In addition, the SGSN 625 may perform Inter-EPC node signaling for mobility between 2G/3G and E-UTRAN 3GPP access networks; PDN and S-GW selection as specified by the MMEs 621; handling of UE 601 time zone functions as specified by the MMEs 621; and MME selection for handovers to E-UTRAN 3GPP access network. The S3 reference point between the MMEs 621 and the SGSN 625 may enable user and bearer information exchange for inter-3GPP access network mobility in idle and/or active states.

The HSS 624 may comprise a database for network users, including subscription-related information to support the network entities' handling of communication sessions. The EPC 620 may comprise one or several HSSs 624, depending on the number of mobile subscribers, on the capacity of the equipment, on the organization of the network, etc. For example, the HSS 624 can provide support for routing/roaming, authentication, authorization, naming/addressing resolution, location dependencies, etc. An S6a reference point between the HSS 624 and the MMEs 621 may enable transfer of subscription and authentication data for authenticating/authorizing user access to the EPC 620 between HSS 624 and the MMEs 621.

The S-GW 622 may terminate the S1 interface 513 ("S1-U" in FIG. 6) toward the RAN 610, and routes data packets between the RAN 610 and the EPC 620. In addition, the S-GW 622 may be a local mobility anchor point for inter-RAN node handovers and also may provide an anchor for inter-3GPP mobility. Other responsibilities may include lawful intercept, charging, and some policy enforcement. The S11 reference point between the S-GW 622 and the MMEs 621 may provide a control plane between the MMEs 621 and the S-GW 622. The S-GW 622 may be coupled with the P-GW 623 via an S5 reference point.

The P-GW 623 may terminate an SGi interface toward a PDN 630. The P-GW 623 may route data packets between the EPC 620 and external networks such as a network including the application server 530 (alternatively referred to as an "AF") via an IP interface 525 (see e.g., FIG. 5). In embodiments, the P-GW 623 may be communicatively coupled to an application server (application server 530 of FIG. 5 or PDN 630 in FIG. 6) via an IP communications interface 525 (see, e.g., FIG. 5). The S5 reference point between the P-GW 623 and the S-GW 622 may provide user plane tunneling and tunnel management between the P-GW 623 and the S-GW 622. The S5 reference point may also be used for S-GW 622 relocation due to UE 601 mobility and if the S-GW 622 needs to connect to a non-collocated P-GW 623 for the required PDN connectivity. The P-GW 623 may further include a node for policy enforcement and charging data collection (e.g., PCEF (not shown)). Additionally, the SGi reference point between the P-GW 623 and the packet data network (PDN) 630 may be an operator external public, a private PDN, or an intra operator packet data network, for example, for provision of IMS services. The P-GW 623 may be coupled with a PCRF 626 via a Gx reference point.

PCRF 626 is the policy and charging control element of the EPC 620. In a non-roaming scenario, there may be a single PCRF 626 in the Home Public Land Mobile Network (HPLMN) associated with a UE 601's Internet Protocol Connectivity Access Network (IP-CAN) session. In a roaming scenario with local breakout of traffic, there may be two PCRFs associated with a UE 601's IP-CAN session, a Home PCRF (H-PCRF) within an HPLMN and a Visited PCRF (V-PCRF) within a Visited Public Land Mobile Network (VPLMN). The PCRF 626 may be communicatively coupled to the application server 630 via the P-GW 623. The application server 630 may signal the PCRF 626 to indicate a new service flow and select the appropriate QoS and charging parameters. The PCRF 626 may provision this rule into a PCEF (not shown) with the appropriate TFT and QCI, which commences the QoS and charging as specified by the application server 630. The Gx reference point between the PCRF 626 and the P-GW 623 may allow for the transfer of QoS policy and charging mules from the PCRF 626 to PCEF in the P-GW 623. An Rx reference point may reside between the PDN 630 (or "AF 630") and the PCRF 626.

Figure 7:
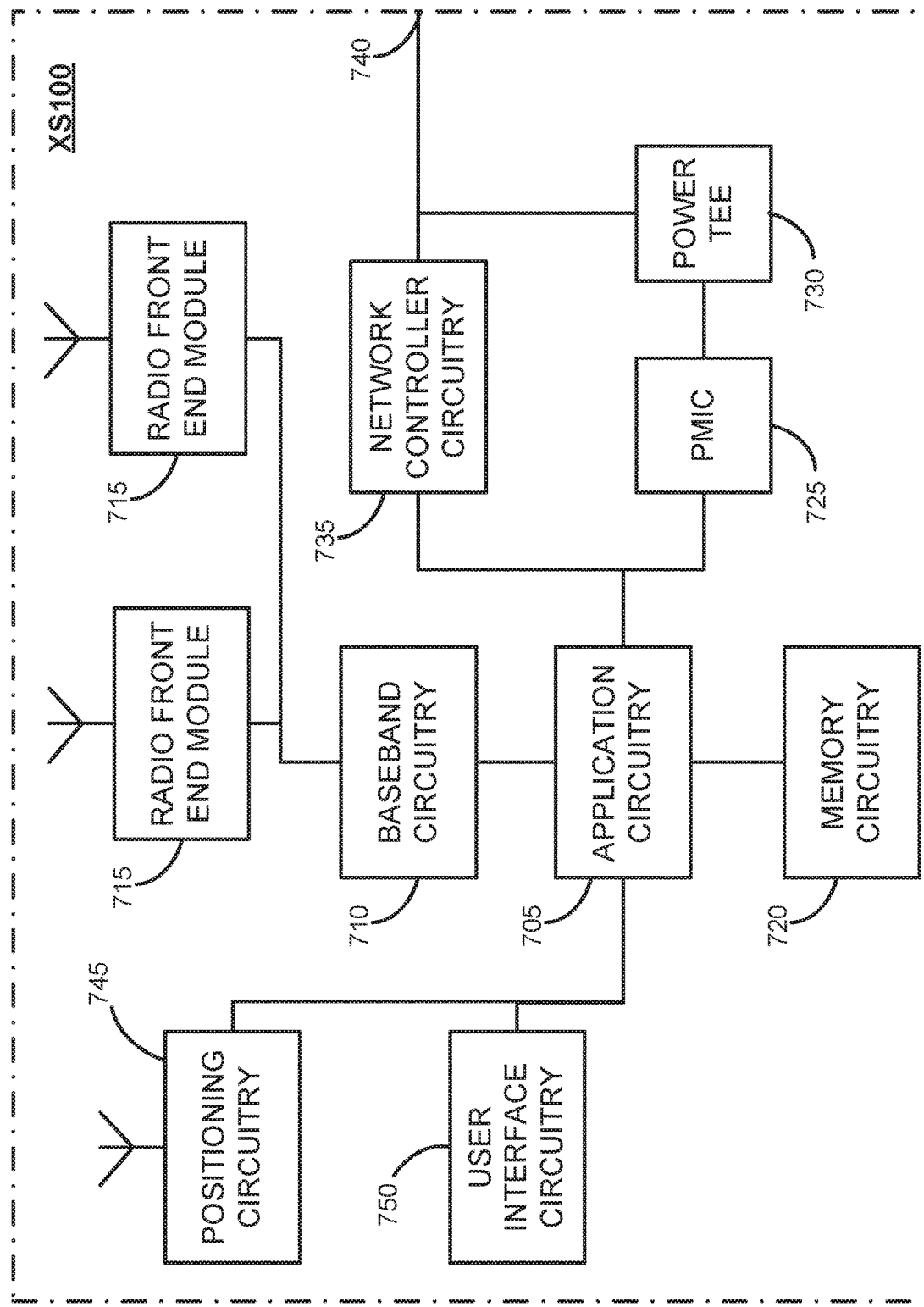
FIG. 7 is a block diagram of an example of infrastructure equipment, according to some implementations of the present disclosure.

FIG. 7 illustrates an example of infrastructure equipment 700 in accordance with various embodiments. The infrastructure equipment 700 (or "system 700") may be implemented as a base station, radio head, RAN node such as the RAN nodes 511 and/or AP 506 shown and described previously, application server(s) 530, and/or any other element/device discussed herein. In other examples, the system 700 could be implemented in or by a UE.

The system 700 includes application circuitry 705, baseband circuitry 710, one or more radio front end modules (RFEMs) 715, memory circuitry 720, power management integrated circuitry (PMIC) 725, power tee circuitry 730, network controller circuitry 735, network interface connector 740, satellite positioning circuitry 745, and user interface circuitry 750. In some embodiments, the device 700 may include additional elements such as, for example, memory/storage, display, camera, sensor, or input/output (I/O) interface. In other embodiments, the components described below may be included in more than one device. For example, said circuitries may be separately included in more than one device for CRAN, vBBU, or other like implementations.

Application circuitry 705 includes circuitry such as, but not limited to one or more processors (or processor cores), cache memory, and one or more of low drop-out voltage regulators (LDOs), interrupt controllers, serial interfaces such as SPI, I2C or universal programmable serial interface module, real time clock (RTC), timer-counters including interval and watchdog timers, general purpose input/output (I/O or IO), memory card controllers such as Secure Digital (SD) MultiMediaCard (MMC) or similar, Universal Serial Bus (USB) interfaces, Mobile Industry Processor Interface (MIPI) interfaces and Joint Test Access Group (JTAG) test access ports. The processors (or cores) of the application circuitry 705 may be coupled with or may include memory/storage elements and may be configured to execute instructions stored in the memory/storage to enable various applications or operating systems to run on the system 700. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 705 may include, for example, one or more processor cores (CPUs), one or more application processors, one or more graphics processing units (GPUs), one or more reduced instruction set computing (RISC) processors, one or more Acorn RISC Machine (ARM) processors, one or more complex instruction set computing (CISC) processors, one or more digital signal processors (DSP), one or more FPGAs, one or more PLDs, one or more ASICs, one or more microprocessors or controllers, or any suitable combination thereof. In some embodiments, the application circuitry 705 may comprise, or may be, a special-purpose processor/controller to operate according to the various embodiments herein. As examples, the processor(s) of application circuitry 705 may include one or more Apple A-series processors, Intel Pentium®, Core®, or Xeon® processor(s); Advanced Micro Devices (AMD) Ryzen® processor(s), Accelerated Processing Units (APUs), or Epyc® processors; ARM-based processor(s) licensed from ARM Holdings, Ltd. such as the ARM Cortex-A family of processors and the ThunderX2® provided by Cavium™, Inc.; a MIPS-based design from MIPS Technologies, Inc. such as MIPS Warrior P-class processors; and/or the like. In some embodiments, the system 700 may not utilize application circuitry 705, and instead may include a special-purpose processor/controller to process IP data received from an EPC, or 5GC, for example.

In some implementations, the application circuitry 705 may include one or more hardware accelerators, which may be microprocessors, programmable processing devices, or the like. The one or more hardware accelerators may include, for example, computer vision (CV) and/or deep learning (DL) accelerators. As examples, the programmable processing devices may be one or more a field-programmable devices (FPDs) such as field-programmable gate arrays (FPGAs) and the like; programmable logic devices (PLDs) such as complex PLDs (CPLDs), high-capacity PLDs (HCPLDs), and the like; ASICs such as structured ASICs and the like; programmable SoCs (PSoCs); and the like. In such implementations, the circuitry of application circuitry 705 may comprise logic blocks or logic fabric, and other interconnected resources that may be programmed to perform various functions, such as the procedures, methods, functions, etc. of the various embodiments discussed herein. In such embodiments, the circuitry of application circuitry 705 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in look-up-tables (LUTs) and the like.

The baseband circuitry 710 may be implemented, for example, as a solder-down substrate including one or more integrated circuits, a single packaged integrated circuit soldered to a main circuit board or a multi-chip module containing two or more integrated circuits. The various hardware electronic elements of baseband circuitry 710 are discussed infra with regard to FIG. 9.

User interface circuitry 750 may include one or more user interfaces designed to enable user interaction with the system 700 or peripheral component interfaces designed to enable peripheral component interaction with the system 700. User interfaces may include, but are not limited to, one or more physical or virtual buttons a reset button), one or more indicators (e.g., light emitting diodes (LEDs)), a physical keyboard or keypad, a mouse, a touchpad, a touchscreen, speakers or other audio emitting devices, microphones, a printer, a scanner, a headset, a display screen or display device, etc. Peripheral component interfaces may include, but are not limited to, a nonvolatile memory port, a universal serial bus (USB) port, an audio jack, a power supply interface, etc.

The radio front end modules (RFEMs) 715 may comprise a meter wave (mmWave) RFEM and one or more sub-mmWave radio frequency integrated circuits (RFICs). In some implementations, the one or more sub-mmWave RFICs may be physically separated from the mmWave RFEM. The RFICs may include connections to one or more antennas or antenna arrays (see e.g., antenna array 911 of FIG. 9 infra), and the RFEM may be connected to multiple antennas. In alternative implementations, both mmWave and sub-mmWave radio functions may be implemented in the same physical RFEM 715, which incorporates both mmWave antennas and sub-mmWave.

The memory circuitry 720 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magnetoresistive random access memory (MRAM), etc., and may incorporate the three-dimensional (3D) cross-point (XPOINT) memories from Intel® and Micron®. Memory circuitry 720 may be implemented as one or more of solder down packaged integrated circuits, socketed memory modules and plug-in memory cards.

The PMIC 725 may include voltage regulators, surge protectors, power alarm detection circuitry, and one or more backup power sources such as a battery or capacitor. The power alarm detection circuitry may detect one or more of brown out (under-voltage) and surge (over-voltage) conditions. The power tee circuitry 730 may provide for electrical power drawn from a network cable to provide both power supply and data connectivity to the infrastructure equipment 700 using a single cable.

The network controller circuitry 735 may provide connectivity to a network using a standard network interface protocol such as Ethernet, Ethernet over GRE Tunnels, Ethernet over Multiprotocol Label Switching (MPLS), or some other suitable protocol. Network connectivity may be provided to/from the infrastructure equipment 700 via network interface connector 740 using a physical connection, which may be electrical (commonly referred to as a "copper interconnect"), optical, or wireless. The network controller circuitry 735 may include one or more dedicated processors and/or FPGAs to communicate using one or more of the aforementioned protocols. In some implementations, the network controller circuitry 735 may include multiple controllers to provide connectivity to other networks using the same or different protocols.

The positioning circuitry 745 includes circuitry to receive and decode signals transmitted/broadcasted by a positioning network of a global navigation satellite system (GNSS). Examples of navigation satellite constellations (or GNSS) include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 745 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 745 may include a Micro-Technology for Positioning, Navigation, and Timing (Micro-PNT) IC that uses a master timing clock to perform position tracking/estimation without GNSS assistance. The positioning circuitry 745 may also be part of, or interact with, the baseband circuitry 710 and/or RFEMs 715 to communicate with the nodes and components of the positioning network. The positioning circuitry 745 may also provide position data and/or time data to the application circuitry 705, which may use the data to synchronize operations with various infrastructure (e.g., RAN nodes 511, etc.), or the like.

The components shown by FIG. 7 may communicate with one another using interface circuitry, which may include any number of bus and/or interconnect (IX) technologies such as industry standard architecture (ISA), extended ISA (EISA), peripheral component interconnect (PCI), peripheral component interconnect extended (PCIx), PCI express (PCIe), or any number of other technologies. The bus/IX may be a proprietary bus, for example, used in a SoC based system. Other bus/IX systems may be included, such as an I2C interface, an SPI interface, point to point interfaces, and a power bus, among others.

Figure 8:
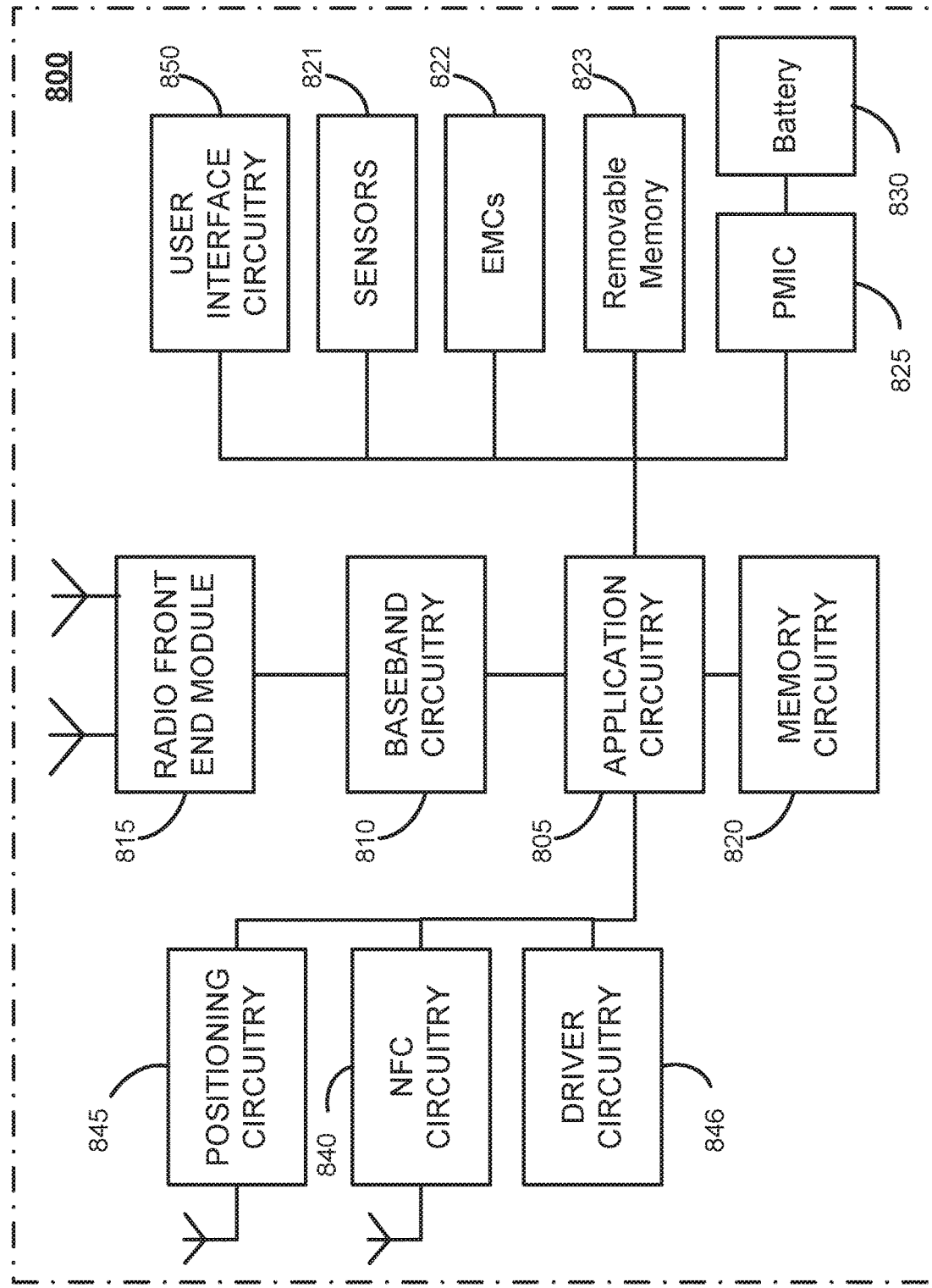
FIG. 8 is a block diagram of an example of platform, according to some implementations of the present disclosure.

FIG. 8 illustrates an example of a platform 800 (or "device 800") in accordance with various embodiments. In embodiments, the computer platform 800 may be suitable for use as UEs 501, 601, application servers 530, and/or any other element/device discussed herein. The platform 800 may include any combinations of the components shown in the example. The components of platform 800 may be implemented as integrated circuits (ICs), portions thereof, discrete electronic devices, or other modules, logic, hardware, software, firmware, or a combination thereof adapted in the computer platform 800, or as components otherwise incorporated within a chassis of a larger system. The block diagram of FIG. 8 is intended to show a high level view of components of the computer platform 800. However, some of the components shown may be omitted, additional components may be present, and different arrangement of the components shown may occur in other implementations.

Application circuitry 805 includes circuitry such as, but not limited to one or more processors (or processor cores), cache memory, and one or more of LDOs, interrupt controllers, serial interfaces such as SPI, I2C or universal programmable serial interface module; RTC, timer-counters including interval and watchdog timers, general purpose I/O, memory card controllers such as SD MMC or similar, USB interfaces, MIDI interfaces, and JTAG test access ports. The processors (or cores) of the application circuitry 805 may be coupled with or may include memory/storage elements and may be configured to execute instructions stored in the memory/storage to enable various applications or operating systems to run on the system 800. In some implementations, the memory/storage elements may be on-chip memory circuitry, which may include any suitable volatile and/or non-volatile memory, such as DRAM, SRAM, EPROM, EEPROM, Flash memory; solid-state memory, and/or any other type of memory device technology, such as those discussed herein.

The processor(s) of application circuitry 705 may include, for example, one or more processor cores, one or more application processors, one or more GPUs, one or more RISC processors, one or more ARM processors, one or more CISC processors, one or more DSP, one or more FPGAs, one or more PLDs, one or more ASICs, one or more microprocessors or controllers, a multithreaded processor, an ultra-low voltage processor, an embedded processor, some other known processing element, or any suitable combination thereof. In some embodiments, the application circuitry 705 may comprise, or may be, a special-purpose processor/controller to operate according to the various embodiments herein.

As examples, the processor(s) of application circuitry 805 may include an Apple A-series processor. The processors of the application circuitry 805 may also be one or more of an Intel® Architecture Core™ based processor, such as a Quark™, an Atom™, an i3, an i5, an i7, or an MCU-class processor, or another such processor available from Intel® Corporation, Santa Clara, CA; Advanced Micro Devices (AMD) Ryzen® processor(s) or Accelerated Processing Units (APUs); A5-A9 processor(s) from Apple® Inc., Snapdragon™ processor(s) from Qualcomm® Technologies, Inc., Texas Instruments, Inc.® Open Multimedia Applications Platform (OMAP)™ processor(s); a MIPS-based design from MIPS Technologies, Inc. such as MIPS Warrior M-class, Warrior I-class, and Warrior P-class processors; an ARM-based design licensed from ARM Holdings, Ltd., such as the ARM Cortex-A Cortex-R, and Cortex-M family of processors; or the like. In some implementations, the application circuitry 805 may be a part of a system on a chip (SoC) in which the application circuitry 805 and other components are formed into a single integrated circuit, or a single package.

Additionally or alternatively, application circuitry 805 may include circuitry such as, but not limited to, one or more a field-programmable devices (FPDs) such as FPGAs and the like; programmable logic devices (PLDs) such as complex PLDs (CPLDs), high-capacity PLDs (HCPLDs), and the like; ASICs such as structured ASICs and the like; programmable SoCs (PSoCs); and the like. In such embodiments, the circuitry of application circuitry 805 may comprise logic blocks or logic fabric, and other interconnected resources that may be programmed to perform various functions, such as the procedures, methods, functions, etc. of the various embodiments discussed herein. In such embodiments, the circuitry of application circuitry 805 may include memory cells (e.g., erasable programmable read-only memory (EPROM), electrically erasable programmable read-only memory (EEPROM), flash memory, static memory (e.g., static random access memory (SRAM), antifuses, etc.)) used to store logic blocks, logic fabric, data, etc. in look-up tables (LUTs) and the like.

The baseband circuitry 810 may be implemented, for example, as a solder-down substrate including one or more integrated circuits, a single packaged integrated circuit soldered to a main circuit board or a multi-chip module containing two or more integrated circuits. The various hardware electronic elements of baseband circuitry 810 are discussed infra with regard to FIG. 9.

The RFEMs 815 may comprise a millimeter wave (mmWave) RFEM and one or more sub-mmWave radio frequency integrated circuits (RFICs). In some implementations, the one or more sub-mmWave RFICs may be physically separated from the mmWave RFEM. The RFICs may include connections to one or more antennas or antenna arrays (see e.g., antenna array 911 of FIG. 9 infra), and the RFEM may be connected to multiple antennas. In alternative implementations, both mmWave and sub-mmWave radio functions may be implemented in the same physical RFEM 815, which incorporates both mmWave antennas and sub-mmWave.

The memory circuitry 820 may include any number and type of memory devices used to provide for a given amount of system memory. As examples, the memory circuitry 820 may include one or more of volatile memory including random access memory (RAM), dynamic RAM (DRAM) and/or synchronous dynamic RAM (SDRAM), and nonvolatile memory (NVM) including high-speed electrically erasable memory (commonly referred to as Flash memory), phase change random access memory (PRAM), magnetoresistive random access memory (MRAM), etc. The memory circuitry 820 may be developed in accordance with a Joint Electron Devices Engineering Council (JEDEC) low power double data rate (LPDDR)-based design, such as LPDDR2, LPDDR3, LPDDR4, or the like. Memory circuitry 820 may be implemented as one or more of solder down packaged integrated circuits, single die package (SDP), dual die package (DDP) or quad die package (Q17P), socketed memory modules, dual inline memory modules (DIMMs) including microDIMMs or MiniDIMMs, and/or soldered onto a motherboard via a ball grid array (BGA). In low power implementations, the memory circuitry 820 may be on-die memory or registers associated with the application circuitry 805. To provide for persistent storage of information such as data, applications, operating systems and so forth, memory circuitry 820 may include one or more mass storage devices, which may include, inter alia, a solid state disk drive (SSDD), hard disk drive (HDD), a micro HDD, resistance change memories, phase change memories, holographic memories, or chemical memories, among others. For example, the computer platform 800 may incorporate the three-dimensional (3D) cross-point (XPOINT) memories from Intel® and Micron®.

Removable memory circuitry 823 may include devices, circuitry, enclosures/housings, ports or receptacles, etc. used to couple portable data storage devices with the platform 800. These portable data storage devices may be used for mass storage purposes, and may include, for example, flash memory cards (e.g., Secure Digital (SD) cards, microSD cards, xD picture cards, and the like), and USB flash drives, optical discs, external HDDs, and the like.

The platform 800 may also include interface circuitry (not shown) that is used to connect external devices with the platform 800. The external devices connected to the platform 800 via the interface circuitry include sensor circuitry 821 and electro-mechanical components (EMCs) 822, as well as removable memory devices coupled to removable memory circuitry 823.

The sensor circuitry 821 include devices, modules, or subsystems whose purpose is to detect events or changes in its environment and send the information (sensor data) about the detected events to some other a device, module, subsystem, etc. Examples of such sensors include, inter alia, inertia measurement units (IMUs) comprising accelerometers, gyroscopes, and/or magnetometers; microelectromechanical systems (MEMS) or nanoelectromechanical systems (NEMS) comprising 3-axis accelerometers, 3-axis gyroscopes, and/or magnetometers; level sensors; flow sensors; temperature sensors (e.g., thermistors); pressure sensors; barometric pressure sensors; gravimeters; altimeters; image capture devices (e.g., cameras or lensless apertures); light detection and ranging (LiDAR) sensors; proximity sensors (e.g., infrared radiation detector and the like), depth sensors, ambient light sensors, ultrasonic transceivers; microphones or other like audio capture devices; etc.

EMCs 822 include devices, modules, or subsystems whose purpose is to enable platform 800 to change its state, position, and/or orientation, or move or control a mechanism or (sub)system. Additionally, EMCs 822 may be configured to generate and send messages/signaling to other components of the platform 800 to indicate a current state of the EMCs 822. Examples of the EMCs 822 include one or more power switches; relays including electromechanical relays (EMRs) and/or solid state relays (SSRs), actuators (e.g., valve actuators, etc.), an audible sound generator, a visual warning device, motors (e.g., DC motors, stepper motors, etc.), wheels, thrusters, propellers, claws, clamps, hooks, and/or other like electro-mechanical components. In embodiments, platform 800 is configured to operate one or more EMCs 822 based on one or more captured events and/or instructions or control signals received from a service provider and/or various clients.

In some implementations, the interface circuitry may connect the platform 800 with positioning circuitry 845. The positioning circuitry 845 includes circuitry to receive and decode signals transmitted/broadcasted by a positioning network of a GNSS. Examples of navigation satellite constellations (or GNSS) include United States' GPS, Russia's GLONASS, the European Union's Galileo system, China's BeiDou Navigation Satellite System, a regional navigation system or GNSS augmentation system (e.g., NAVIC) Japan's QZSS, France's DORIS, etc.), or the like. The positioning circuitry 845 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 845 may include a Micro-PNT IC that uses a master timing clock to perform position tracking/estimation without GNSS assistance. The positioning circuitry 845 may also be part of, or interact with, the baseband circuitry 710 and/or RFEMs 815 to communicate with the nodes and components of the positioning network. The positioning circuitry 845 may also provide position data and/or time data to the application circuitry 805, which may use the data to synchronize operations with various infrastructure (e.g., radio base stations), for turn-by-turn navigation applications, or the like In some implementations, the interface circuitry may connect the platform 800 with Near-Field Communication (NFC) circuitry 840. NFC circuitry 840 is configured to provide contactless, short-range communications based on radio frequency identification (RFID) standards, wherein magnetic field induction is used to enable communication between NFC circuitry 840 and NFC-enabled devices external to the platform 800 (e.g., an "NFC touchpoint"). NFC circuitry 840 comprises an NFC controller coupled with an antenna element and a processor coupled with the NFC controller. The NFC controller may be a chip/IC providing NFC functionalities to the NFC circuitry 840 by executing NFC controller firmware and an NFC stack. The NFC stack may be executed by the processor to control the NFC controller, and the NFC controller firmware may be executed by the NFC controller to control the antenna element to emit short-range RF signals. The RF signals may power a passive NFC tag (e.g., a microchip embedded in a sticker or wristband) to transmit stored data to the NFC circuitry 840, or initiate data transfer between the NFC circuitry 840 and another active NFC device (e.g., a smartphone or an NFC-enabled POS terminal) that is proximate to the platform 800.

The driver circuitry 846 may include software and hardware elements that operate to control particular devices that are embedded in the platform 800, attached to the platform 800, or otherwise communicatively coupled with the platform 800. The driver circuitry 846 may include individual drivers allowing other components of the platform 800 to interact with or control various input/output (I/O) devices that may be present within, or connected to, the platform 800. For example, driver circuitry 846 may include a display driver to control and allow access to a display device, a touchscreen driver to control and allow access to a touch-screen interface of the platform 800, sensor drivers to obtain sensor readings of sensor circuitry 821 and control and allow access to sensor circuitry 821, EMC drivers to obtain actuator positions of the EMCs 822 and/or control and allow access to the EMCs 822, a camera driver to control and allow access to an embedded image capture device, audio drivers to control and allow access to one or more audio devices.

The power management integrated circuitry (PMIC) 825 (also referred to as "power management circuitry 825") may manage power provided to various components of the platform 800. In particular, with respect to the baseband circuitry 810, the PMIC 825 may control power-source selection, voltage scaling, battery charging, or DC-to-DC conversion. The PMIC 825 may often be included when the platform 800 is capable of being powered by a battery 830, for example, when the device is included in a UE 501, 601.

In some embodiments, the PMIC 825 may control, or otherwise be part of, various power saving mechanisms of the platform 800. For example, if the platform 800 is in an RRC_Connected state, where it is still connected to the RAN node as it expects to receive traffic shortly, then it may enter a state known as Discontinuous Reception Mode (DRX) after a period of inactivity. During this state, the platform 800 may power down for brief intervals of time and thus save power. If there is no data traffic activity for an extended period of time, then the platform 800 may transition off to an RRC_Idle state, where it disconnects from the network and does not perform operations such as channel quality feedback, handover, etc. The platform 800 goes into a very low power state and it performs paging where again it periodically wakes up to listen to the network and then powers down again. The platform 800 may not receive data in this state; in order to receive data, it must transition back to RRC_Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

A battery 830 may power the platform 800, although in some examples the platform 800 may be mounted deployed in a fixed location, and may have a power supply coupled to an electrical grid. The battery 830 may be a lithium ion battery, a metal-air battery, such as a zinc-air battery, an aluminum-air battery, a lithium-air battery, and the like. In some implementations, such as in V2X applications, the battery 830 may be a typical lead-acid automotive battery.

In some implementations, the battery 830 may be a "smart battery," which includes or is coupled with a Battery Management System (BMS) or battery monitoring integrated circuitry. The BMS may be included in the platform 800 to track the state of charge (SoCh) of the battery 830. The BMS may be used to monitor other parameters of the battery 830 to provide failure predictions, such as the state of health (SoH) and the state of function (SoF) of the battery 830. The BMS may communicate the information of the battery 830 to the application circuitry 805 or other components of the platform 800. The BMS may also include an analog-to-digital (ADC) convertor that allows the application circuitry 805 to directly monitor the voltage of the battery 830 or the current flow from the battery 830. The battery parameters may be used to determine actions that the platform 800 may perform, such as transmission frequency, network operation, sensing frequency, and the like.

A power block, or other power supply coupled to an electrical grid may be coupled with the BMS to charge the battery 830. In some examples, the power block XS30 may be replaced with a wireless power receiver to obtain the power wirelessly, for example, through a loop antenna in the computer platform 800. In these examples, a wireless battery charging circuit may be included in the BMS. The specific charging circuits chosen may depend on the size of the battery 830, and thus, the current required. The charging may be performed using the Airfuel standard promulgated by the Airfuel Alliance, the Qi wireless charging standard promulgated by the Wireless Power Consortium, or the Rezence charging standard promulgated by the Alliance for Wireless Power, among others.

User interface circuitry 850 includes various input/output (I/O) devices present within, or connected to, the platform 800, and includes one or more user interfaces designed to enable user interaction with the platform 800 and/or peripheral component interfaces designed to enable peripheral component interaction with the platform 800. The user interface circuitry 850 includes input device circuitry and output device circuitry. Input device circuitry includes any physical or virtual means for accepting an input including, inter alia, one or more physical or virtual buttons (e.g., a reset button), a physical keyboard, keypad, mouse, touchpad, touchscreen, microphones, scanner, headset, and/or the like. The output device circuitry includes any physical or virtual means for showing information or otherwise conveying information, such as sensor readings, actuator position(s), or other like information. Output device circuitry may include any number and/or combinations of audio or visual display, including, inter alia, one or more simple visual outputs/indicators (e.g., binary status indicators (e.g., light emitting diodes (LEDs)) and multi-character visual outputs or more complex outputs such as display devices or touchscreens (e.g., Liquid Chrystal Displays (LCD), LED displays, quantum dot displays, projectors, etc.), with the output of characters, graphics, multimedia objects, and the like being generated or produced from the operation of the platform 800. The output device circuitry may also include speakers or other audio emitting devices, printer(s), and/or the like. In some embodiments, the sensor circuitry 821 may be used as the input device circuitry (e.g., an image capture device, motion capture device, or the like) and one or more EMCs may be used as the output device circuitry (e.g., an actuator to provide haptic feedback or the like). In another example, NFC circuitry comprising an NFC controller coupled with an antenna element and a processing device may be included to read electronic tags and/or connect with another NFC-enabled device. Peripheral component interfaces may include, but are not limited to, a non-volatile memory port, a USB port, an audio jack, a power supply interface, etc.

Although not shown, the components of platform 800 may communicate with one another using a suitable bus or interconnect (IX) technology, which may include any number of technologies, including ISA, EISA, PCI, PCIx, a Time-Trigger Protocol (TTP) system, a FlexRay system, or any number of other technologies. The bus/IX may be a proprietary bus/IX, for example, used in a SoC based system. Other bus/IX systems may be included, such as an I2C interface, an SPI interface, point-to-point interfaces, and a power bus, among others.

Figure 9:
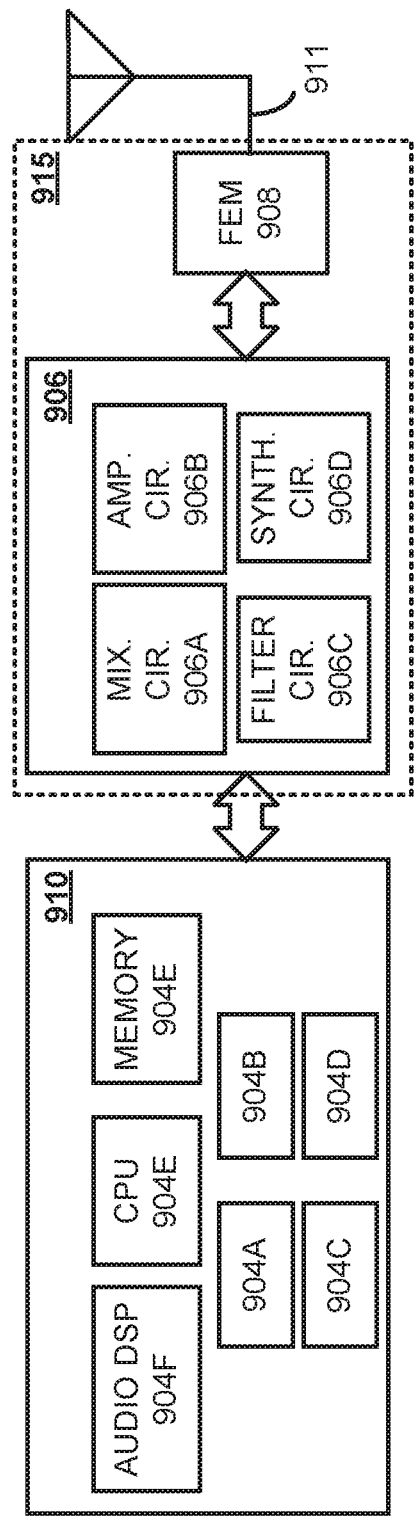
FIG. 9 is a block diagram of an example of components of baseband circuitry and radio front end modules (RFEM), according to some implementations of the present disclosure.

FIG. 9 illustrates example components of baseband circuitry 910 and radio front end modules (RFEM) 915 in accordance with various embodiments. The baseband circuitry 910 corresponds to the baseband circuitry 710 and 810 of FIGS. 7 and 8, respectively. The RFEM 915 corresponds to the RFEM 715 and 815 of FIGS. 7 and 8, respectively. As shown, the RFEMs 915 may include Radio Frequency (RF) circuitry 906, front-end module (FEM) circuitry 908, antenna array 911 coupled together at least as shown.

The baseband circuitry 910 includes circuitry and/or control logic configured to carry out various radio/network protocol and radio control functions that enable communication with one or more radio networks via the RF circuitry 906. The radio control functions may include, but are not limited to, signal modulation/demodulation, encoding/decoding, radio frequency shifting, etc. In some embodiments, modulation/demodulation circuitry of the baseband circuitry 910 may include Fast-Fourier Transform (FFT), precoding, or constellation mapping/de-mapping functionality. In some embodiments, encoding/decoding circuitry of the baseband circuitry 910 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments. The baseband circuitry 910 is configured to process baseband signals received from a receive signal path of the RF circuitry 906 and to generate baseband signals for a transmit signal path of the RF circuitry 906. The baseband circuitry 910 is configured to interface with application circuitry 705/805 (see FIGS. 7 and 8) for generation and processing of the baseband signals and for controlling operations of the RF circuitry 906. The baseband circuitry 910 may handle various radio control functions.

The aforementioned circuitry and/or control logic of the baseband circuitry 910 may include one or more single or multi-core processors. For example, the one or more processors may include a 3G baseband processor 904A, a 4G/LTE baseband processor 904B, a 5G/NR baseband processor 904C, or some other baseband processor(s) 904D for other existing generations, generations in development or to be developed in the future (e.g., sixth generation (6G), etc.). In other embodiments, some or all of the functionality of baseband processors 904A-D may be included in modules stored in the memory 904G and executed via a Central Processing Unit (CPU) 904E. In other embodiments, some or all of the functionality of baseband processors 904A-D may be provided as hardware accelerators FPGAs, ASICs, etc.) loaded with the appropriate bit streams or logic blocks stored in respective memory cells. In various embodiments, the memory 904G may store program code of a real-time OS (RTOS), which when executed by the CPU 904E (or other baseband processor), is to cause the CPU 904E (or other baseband processor) to manage resources of the baseband circuitry 910, schedule tasks, etc. Examples of the RTOS may include Operating System Embedded (OSE)™ provided by Enea®, Nucleus RTOS™ provided by Mentor Graphics®, Versatile Real-Time Executive (VRTX) provided by Mentor Graphics®, ThreadX™ provided by Express Logic®, FreeRTOS, REX OS provided by Qualcomm®, OKL4 provided by Open Kernel (OK) Labs®, or any other suitable RTOS, such as those discussed herein. In addition, the baseband circuitry 910 includes one or more audio digital signal processor(s) (DSP) 904F. The audio DSP(s) 904F include elements for compression/decompression and echo cancellation and may include other suitable processing elements in other embodiments.

In some embodiments, each of the processors 904A-904E include respective memory interfaces to send/receive data to/from the memory 904G. The baseband circuitry 910 may further include one or more interfaces to communicatively couple to other circuitries/devices, such as an interface to send/receive data to/from memory external to the baseband circuitry 910; an application circuitry interface to send/receive data to/from the application circuitry 705/805 of FIGS. 7-9); an RF circuitry interface to send/receive data to/from RF circuitry 906 of FIG. 9; a wireless hardware connectivity interface to send/receive data to/from one or more wireless hardware elements (e.g., Near Field Communication (NFC) components, Bluetooth®/Bluetooth® Low Energy components, Wi-Fi® components, and/or the like); and a power management interface to send/receive power or control signals to/from the PMIC 825.

In alternate embodiments (which may be combined with the above described embodiments), baseband circuitry 910 comprises one or more digital baseband systems, which are coupled with one another via an interconnect subsystem and to a CPU subsystem, an audio subsystem, and an interface subsystem. The digital baseband subsystems may also be coupled to a digital baseband interface and a mixed-signal baseband subsystem via another interconnect subsystem. Each of the interconnect subsystems may include a bus system, point-to-point connections, network-on-chip (NOC) structures, and/or some other suitable bus or interconnect technology, such as those discussed herein. The audio subsystem may include DSP circuitry, buffer memory, program memory, speech processing accelerator circuitry, data converter circuitry such as analog-to-digital and digital-to-analog converter circuitry, analog circuitry including one or more of amplifiers and filters, and/or other like components. In an aspect of the present disclosure, baseband circuitry 910 may include protocol processing circuitry with one or more instances of control circuitry (not shown) to provide control functions for the digital baseband circuitry and/or radio frequency circuitry (e.g., the radio front end modules 915).

Although not shown by FIG. 9, in some embodiments, the baseband circuitry 910 includes individual processing device(s) to operate one or more wireless communication protocols (e.g., a "multi-protocol baseband processor" or "protocol processing circuitry") and individual processing device(s) to implement PHY layer functions. In these embodiments, the PHY layer functions include the aforementioned radio control functions. In these embodiments, the protocol processing circuitry operates or implements various protocol layers/entities of one or more wireless communication protocols. In a first example, the protocol processing circuitry may operate LTE protocol entities and/or 5G/NR protocol entities when the baseband circuitry 910 and/or RF circuitry 906 are part of mmWave communication circuitry or some other suitable cellular communication circuitry. In the first example, the protocol processing circuitry would operate MAC, RLC, PDCP, SDAP, RRC, and NAS functions. In a second example, the protocol processing circuitry may operate one or more IEEE-based protocols when the baseband circuitry 910 and/or RF circuitry 906 are part of a Wi-Fi communication system. In the second example, the protocol processing circuitry would operate Wi-Fi MAC and logical link control (LLC) functions. The protocol processing circuitry may include one or more memory structures (e.g., 904G) to store program code and data for operating the protocol functions, as well as one or more processing cores to execute the program code and perform various operations using the data. The baseband circuitry 910 may also support radio communications for more than one wireless protocol.

The various hardware elements of the baseband circuitry 910 discussed herein may be implemented, for example, as a solder-down substrate including one or more integrated circuits (ICs), a single packaged IC soldered to a main circuit board or a multi-chip module containing two or more ICs. In one example, the components of the baseband circuitry 910 may be suitably combined in a single chip or chipset, or disposed on a same circuit board. In another example, some or all of the constituent components of the baseband circuitry 910 and RF circuitry 906 may be implemented together such as, for example, a system on a chip (SoC) or System-in-Package (SiP). In another example, some or all of the constituent components of the baseband circuitry 910 may be implemented as a separate SoC that is communicatively coupled with and RF circuitry 906 (or multiple instances of RF circuitry 906). In yet another example, some or all of the constituent components of the baseband circuitry 910 and the application circuitry 705/805 may be implemented together as individual SoCs mounted to a same circuit board (e.g., a "multi-chip package").

In some embodiments, the baseband circuitry 910 may provide for communication compatible with one or more radio technologies. For example, in some embodiments, the baseband circuitry 910 may support communication with an E-UTRAN or other WMAN, a WLAN, a WPAN. Embodiments in which the baseband circuitry 910 is configured to support radio communications of more than one wireless protocol may be referred to as multi-mode baseband circuitry.

RF circuitry 906 may enable communication with wireless networks using modulated electromagnetic radiation through a non-solid medium. In various embodiments, the RF circuitry 906 may include switches, filters, amplifiers, etc. to facilitate the communication with the wireless network. RF circuitry 906 may include a receive signal path, which may include circuitry to down-convert RF signals received from the FEM circuitry 908 and provide baseband signals to the baseband circuitry 910. RF circuitry 906 may also include a transmit signal path, which may include circuitry to up-convert baseband signals provided by the baseband circuitry 910 and provide RF output signals to the FEM circuitry 908 for transmission.

In some embodiments, the receive signal path of the RF circuitry 906 may include mixer circuitry 906a, amplifier circuitry 906b and filter circuitry 906c. In some embodiments, the transmit signal path of the RF circuitry 906 may include filter circuitry 906c and mixer circuitry 906a. RF circuitry 906 may also include synthesizer circuitry 906d for synthesizing a frequency for use by the mixer circuitry 906a of the receive signal path and the transmit signal path. In some embodiments, the mixer circuitry 906a of the receive signal path may be configured to down-convert RF signals received from the FEM circuitry 908 based on the synthesized frequency provided by synthesizer circuitry 906d. The amplifier circuitry 906b may be configured to amplify the down-converted signals and the filter circuitry 906c may be a low-pass filter (LPF) or band-pass filter (BPF) configured to remove unwanted signals from the down-converted signals to generate output baseband signals. Output baseband signals may be provided to the baseband circuitry 910 for further processing. In some embodiments, the output baseband signals may be zero-frequency baseband signals, although this is not a requirement. In some embodiments, mixer circuitry 906a of the receive signal path may comprise passive mixers, although the scope of the embodiments is not limited in this respect.

In some embodiments, the mixer circuitry 906a of the transmit signal path may be configured to up-convert input baseband signals based on the synthesized frequency provided by the synthesizer circuitry 906d to generate RF output signals for the FEM circuitry 908. The baseband signals may be provided by the baseband circuitry 910 and may be filtered by filter circuitry 906c.

In some embodiments, the mixer circuitry 906a of the receive signal path and the mixer circuitry 906a of the transmit signal path may include two or more mixers and may be arranged for quadrature downconversion and upconversion, respectively. In some embodiments, the mixer circuitry 906a of the receive signal path and the mixer circuitry 906a of the transmit signal path may include two or more mixers and may be arranged for image rejection (e.g., Hartley image rejection). In some embodiments, the mixer circuitry 906a of the receive signal path and the mixer circuitry 906a of the transmit signal path may be arranged for direct downconversion and direct upconversion, respectively. In some embodiments, the mixer circuitry 906a of the receive signal path and the mixer circuitry 906a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 906 may include analog-to-digital converter (ADC) and digital-to-analog converter (DAC) circuitry and the baseband circuitry 910 may include a digital baseband interface to communicate with the RF circuitry 906.

In some dual-mode embodiments, a separate radio IC circuitry may be provided for processing signals for each spectrum, although the scope of the embodiments is not limited in this respect.

In some embodiments, the synthesizer circuitry 906d may be a fractional-N synthesizer or a fractional N/N+1 synthesizer, although the scope of the embodiments is not limited in this respect as other types of frequency synthesizers may be suitable. For example, synthesizer circuitry 906d may be a delta-sigma synthesizer, a frequency multiplier, or a synthesizer comprising a phase-locked loop with a frequency divider.

The synthesizer circuitry 906d may be configured to synthesize an output frequency for use by the mixer circuitry 906a of the RF circuitry 906 based on a frequency input and a divider control input. In some embodiments, the synthesizer circuitry 906d may be a fractional N/N+1 synthesizer.

In some embodiments, frequency input may be provided by a voltage controlled oscillator (VCO), although that is not a requirement. Divider control input may be provided by either the baseband circuitry 910 or the application circuitry 705/805 depending on the desired output frequency. In some embodiments, a divider control input (e.g., N) may be determined from a look-up table based on a channel indicated by the application circuitry 705/805.

Synthesizer circuitry 906d of the RF circuitry 906 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 906d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 906 may include an IQ/polar converter.

FEM circuitry 908 may include a receive signal path, which may include circuitry configured to operate on RF signals received from antenna array 911, amplify the received signals and provide the amplified versions of the received signals to the RF circuitry 906 for further processing. FEM circuitry 908 may also include a transmit signal path, which may include circuitry configured to amplify signals for transmission provided by the RF circuitry 906 for transmission by one or more of antenna elements of antenna array 911. In various embodiments, the amplification through the transmit or receive signal paths may be done solely in the RF circuitry 906, solely in the FEM circuitry 908, or in both the RF circuitry 906 and the FEM circuitry 908.

In some embodiments, the FEM circuitry 908 may include a TX/RX switch to switch between transmit mode and receive mode operation. The FEM circuitry 908 may include a receive signal path and a transmit signal path. The receive signal path of the FEM circuitry 908 may include an LNA to amplify received RF signals and provide the amplified received RF signals as an output (e.g., to the RF circuitry 906). The transmit signal path of the FEM circuitry 908 may include a power amplifier (PA) to amplify input RF signals (e.g., provided by RF circuitry 906), and one or more filters to generate RF signals for subsequent transmission by one or more antenna elements of the antenna array 911.

The antenna array 911 comprises one or more antenna elements, each of which is configured convert electrical signals into radio waves to travel through the air and to convert received radio waves into electrical signals. For example, digital baseband signals provided by the baseband circuitry 910 is converted into analog RF signals (e.g., modulated waveform) that will be amplified and transmitted via the antenna elements of the antenna array 911 including one or more antenna elements (not shown). The antenna elements may be omnidirectional, direction, or a combination thereof. The antenna elements may be formed in a multitude of arranges as are known and/or discussed herein. The antenna array 911 may comprise microstrip antennas or printed antennas that are fabricated on the surface of one or more printed circuit boards. The antenna array 911 may be formed in as a patch of metal foil (e.g., a patch antenna) in a variety of shapes, and may be coupled with the RF circuitry 906 and/or FEM circuitry 908 using metal transmission lines or the like.

Processors of the application circuitry 705/805 and processors of the baseband circuitry 910 may be used to execute elements of one or more instances of a protocol stack. For example, processors of the baseband circuitry 910, alone or in combination, may be used execute Layer 3, Layer 2, or Layer 1 functionality, while processors of the application circuitry 705/805 may utilize data (e.g., packet data) received from these layers and further execute Layer 4 functionality (e.g., TCP and UDP layers). As referred to herein, Layer 3 may comprise a RRC layer, described in further detail below. As referred to herein, Layer 2 may comprise a MAC layer, an RLC layer, and a PDCP layer, described in further detail below. As referred to herein, Layer 1 may comprise a PHY layer of a UE/RAN node, described in further detail below.

Figure 10:
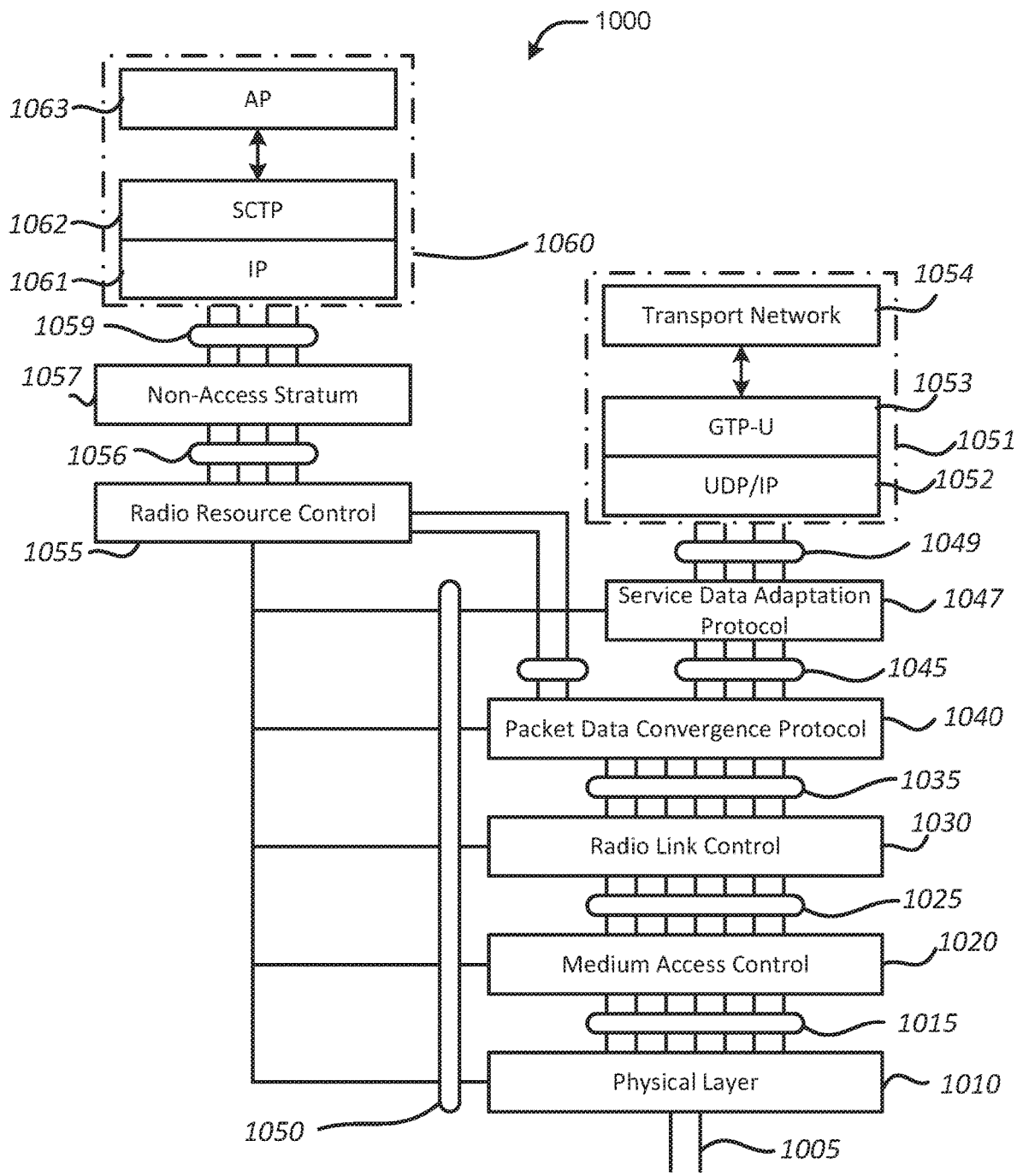
FIG. 10 is a block diagram of various protocol functions that may be implemented in a wireless communication device, according to some implementations of the present disclosure.

FIG. 10 illustrates various protocol functions that may be implemented in a wireless communication device according to various embodiments. In particular, FIG. 10 includes an arrangement 1000 showing interconnections between various protocol layers/entities. The following description of FIG. 10 is provided for various protocol layers/entities that operate in conjunction with the 5G/NR system standards and LTE system standards, but some or all of the aspects of FIG. 10 may be applicable to other wireless communication network systems as well.

The protocol layers of arrangement 1000 may include one or more of PHY 1010, MAC 1020, RLC 1030, PDCP 1040, SDAP 1047, RRC 1055, and NAS layer 1057, in addition to other higher layer functions not illustrated. The protocol layers may include one or more service access points (e.g., items 1059, 1056, 1050, 1049, 1045, 1035, 1025, and 1015 in FIG. 10) that may provide communication between two or more protocol layers.

The PHY 1010 may transmit and receive physical layer signals 1005 that may be received from or transmitted to one or more other communication devices. The physical layer signals 1005 may comprise one or more physical channels, such as those discussed herein. The PHY 1010 may further perform link adaptation or adaptive modulation and coding (AMC), power control, cell search (e.g., for initial synchronization and handover purposes), and other measurements used by higher layers, such as the RRC 1055. The PHY 1010 may still further perform error detection on the transport channels, forward error correction (FEC) coding/decoding of the transport channels, modulation/demodulation of physical channels, interleaving, rate matching, mapping onto physical channels, and MIMO antenna processing. In embodiments, an instance of PHY 1010 may process requests from and provide indications to an instance of MAC 1020 via one or more PHY-SAP 1015. According to some embodiments, requests and indications communicated via PHY-SAP 1015 may comprise one or more transport channels.

Instance(s) of MAC 1020 may process requests from, and provide indications to, an instance of RLC 1030 via one or more MAC-SAPs 1025. These requests and indications communicated via the MAC-SAP 1025 may comprise one or more logical channels. The MAC 1020 may perform mapping between the logical channels and transport channels, multiplexing of MAC SDUs from one or more logical channels onto TBs to be delivered to PHY 1010 via the transport channels, de-multiplexing MAC SDUs to one or more logical channels from TBs delivered from the PHY 1010 via transport channels, multiplexing MAC SDUs onto TBs, scheduling information reporting, error correction through HARQ, and logical channel prioritization.

Instance(s) of RLC 1030 may process requests from and provide indications to an instance of PDCP 1040 via one or more radio link control service access points (RLC-SAP) 1035. These requests and indications communicated via RLC-SAP 1035 may comprise one or more RLC channels. The RLC 1030 may operate in a plurality of modes of operation, including: Transparent Mode (TM), Unacknowledged Mode (UM), and Acknowledged Mode (AM). The RLC 1030 may execute transfer of upper layer protocol data units (PDUs), error correction through automatic repeat request (ARQ) for AM data transfers, and concatenation, segmentation and reassembly of RLC SDUs for UM and AM data transfers. The RLC 1030 may also execute re-segmentation of RLC data PDUs for AM data transfers, reorder RLC data PDUs for UM and AM data transfers, detect duplicate data for UM and AM data transfers, discard RLC SDUs for UM and AM data transfers, detect protocol errors for AM data transfers, and perform RLC re-establishment.

Instance(s) of PDCP 1040 may process requests from and provide indications to instance(s) of RRC 1055 and/or instance(s) of SDAP 1047 via one or more packet data convergence protocol service access points (PDCP-SAP) 1045. These requests and indications communicated via PDCP-SAP 1045 may comprise one or more radio bearers. The PDCP 1040 may execute header compression and decompression of IP data, maintain PDCP Sequence Numbers (SNs), perform in-sequence delivery of upper layer PDUs at re-establishment of lower layers, eliminate duplicates of lower layer SDUs at re-establishment of lower layers for radio bearers mapped on RLC AM, cipher and decipher control plane data, perform integrity protection and integrity verification of control plane data, control timer-based discard of data, and perform security operations (e.g., ciphering, deciphering, integrity protection, integrity verification, etc.).

Instance(s) of SDAP 1047 may process requests from and provide indications to one or more higher layer protocol entities via one or more SDAP-SAP 1049. These requests and indications communicated via SDAP-SAP 1049 may comprise one or more QoS flows. The SDAP 1047 may map QoS flows to DRBs, and vice versa, and may also mark QFIs in DL and UL packets. A single SDAP entity 1047 may be configured for an individual PDU session. In the UL direction, the NG-RAN 510 may control the mapping of QoS Flows to DRB(s) in two different ways, reflective mapping or explicit mapping. For reflective mapping, the SDAP 1047 of a UE 501 may monitor the QFIs of the DL packets for each DRB, and may apply the same mapping for packets flowing in the UL direction. For a DRB, the SDAP 1047 of the UE 501 may map the UL packets belonging to the QoS flows(s) corresponding to the QoS flow ID(s) and PDU session observed in the DL packets for that DRB. To enable reflective mapping, the NG-RAN may mark DL packets over the Uu interface with a QoS flow ID. The explicit mapping may involve the RRC 1055 configuring the SDAP 1047 with an explicit QoS flow to DRB mapping rule, which may be stored and followed by the SDAP 1047. In embodiments, the SDAP 1047 may only be used in NR implementations and may not be used in LTE implementations.

The RRC 1055 may configure, via one or more management service access points (M-SAP), aspects of one or more protocol layers, which may include one or more instances of PHY 1010, MAC 1020, RLC 1030, PDCP 1040 and SDAP 1047. In embodiments, an instance of RRC 1055 may process requests from and provide indications to one or more NAS entities 1057 via one or more RRC-SAPs 1056.

The main services and functions of the RRC 1055 may include broadcast of system information (e.g., included in MIBs or SIBs related to the NAS), broadcast of system information related to the access stratum (AS), paging, establishment, maintenance and release of an RRC connection between the UE 501 and RAN 510 (e.g., RRC connection paging, RRC connection establishment, RRC connection modification, and RRC connection release), establishment, configuration, maintenance and release of point to point Radio Bearers, security functions including key management, inter-RAT mobility, and measurement configuration for UE measurement reporting. The MIBs and SIBs may comprise one or more IEs, which may each comprise individual data fields or data structures.

The NAS 1057 may form the highest stratum of the control plane between the UE 501 and the AMF. The NAS 1057 may support the mobility of the UEs 501 and the session management procedures to establish and maintain IP connectivity between the UE 501 and a P-GW in LTE systems.

According to various embodiments, one or more protocol entities of arrangement 1000 may be implemented in UEs 501, RAN nodes 511, AMF in NR implementations or MME 621 in LTE implementations, UPF in NR implementations or S-GW 622 and P-GW 623 in LTE implementations, or the like to be used for control plane or user plane communications protocol stack between the aforementioned devices. In such embodiments, one or more protocol entities that may be implemented in one or more of UE 501, gNB 511, AMF, etc. may communicate with a respective peer protocol entity that may be implemented in or on another device using the services of respective lower layer protocol entities to perform such communication. In some embodiments, a gNB-CU of the gNB 511 may host the RRC 1055, SDAP 1047, and PDCP 1040 of the gNB that controls the operation of one or more gNB-DUs, and the gNB-DUs of the gNB 511 may each host the RLC 1030, MAC 1020, and PHY 1010 of the gNB 511.

In a first example, a control plane protocol stack may comprise, in order from highest layer to lowest layer, NAS 1057, RRC 1055, PDCP 1040, RLC 1030, MAC 1020, and PHY 1010. In this example, upper layers 1060 may be built on top of the NAS 1057, which includes an IP layer 1061, an SCTP 1062, and an application layer signaling protocol (AP) 1063.

In NR implementations, the AP 1063 may be an NG application protocol layer (NG-AP or NG-AP) 1063 for the NG interface 513 defined between the NG-RAN node 511 and the AMF, or the AP 1063 may be an Xn application protocol layer (XnAP or Xn-AP) 1063 for the Xn interface 512 that is defined between two or more RAN nodes 511.

The NG-AP 1063 may support the functions of the NG interface 513 and may comprise Elementary Procedures (EPs). An NG-AP EP may be a unit of interaction between the NG-RAN node 511 and the AMF. The NG-AP 1063 services may comprise two groups: UE-associated services (e.g., services related to a UE 501) and non-UE-associated services (e.g., services related to the whole NG interface instance between the NG-RAN node 511 and AMF). These services may include functions including, but not limited to: a paging function for the sending of paging requests to NG-RAN nodes 511 involved in a particular paging area; a UE context management function for allowing the AMF to establish, modify, and/or release a UE context in the AMF and the NG-RAN node 511; a mobility function for UEs 501 in ECM-CONNECTED mode for intra-system HOs to support mobility within NG-RAN and inter-system HOs to support mobility from/to EPS systems; a NAS Signaling Transport function for transporting or rerouting NAS messages between UE 501 and AMF; a NAS node selection function for determining an association between the AMF and the UE 501; NG interface management function(s) for setting up the NG interface and monitoring for errors over the NG interface; a warning message transmission function for providing means to transfer warning messages via NG interface or cancel ongoing broadcast of warning messages; a Configuration Transfer function for requesting and transferring of RAN configuration information (e.g., SON information, performance measurement (PM) data, etc.) between two RAN nodes 511 via CN 520; and/or other like functions.

The XnAP 1063 may support the functions of the Xn interface 512 and may comprise XnAP basic mobility procedures and XnAP global procedures. The XnAP basic mobility procedures may comprise procedures used to handle UE mobility within the NG RAN 511 (or E-UTRAN 610), such as handover preparation and cancellation procedures, SN Status Transfer procedures, UE context retrieval and UE context release procedures, RAN paging procedures, dual connectivity related procedures, and the like. The XnAP global procedures may comprise procedures that are not related to a specific UE 501, such as Xn interface setup and reset procedures, NG-RAN update procedures, cell activation procedures, and the like.

In LTE implementations, the AP 1063 may be an S1 Application Protocol layer (S1-AP) 1063 for the S1 interface 513 defined between an E-UTRAN node 511 and an MME, or the AP 1063 may be an X2 application protocol layer (X2AP or X2-AP) 1063 for the X2 interface 512 that is defined between two or more E-UTRAN nodes 511.

The S1 Application Protocol layer (S1-AP) 1063 may support the functions of the S1 interface, and similar to the NG-AP discussed previously, the S1-AP may comprise S1-AP EPs. An S1-AP EP may be a unit of interaction between the E-UTRAN node 511 and an MME 621 within an LTE CN 520. The S1-AP 1063 services may comprise two groups: UE-associated services and non UE-associated services. These services perform functions including, but not limited to: E-UTRAN Radio Access Bearer (E-RAB) management, UE capability indication, mobility, NAS signaling transport, RAN Information Management (RIM), and configuration transfer.

The X2AP 1063 may support the functions of the X2 interface 512 and may comprise X2AP basic mobility procedures and X2AP global procedures. The X2AP basic mobility procedures may comprise procedures used to handle UE mobility within the E-UTRAN 520, such as handover preparation and cancellation procedures, SN Status Transfer procedures, UE context retrieval and UE context release procedures, RAN paging procedures, dual connectivity related procedures, and the like. The X2AP global procedures may comprise procedures that are not related to a specific UE 501, such as X2 interface setup and reset procedures, load indication procedures, error indication procedures, cell activation procedures, and the like.

The SCTP layer (alternatively referred to as the SCTP/IP layer) 1062 may provide guaranteed delivery of application layer messages (e.g., NG AP or XnAP messages in NR implementations, or S1-AP or X2AP messages in LTE implementations). The SCTP 1062 may ensure reliable delivery of signaling messages between the RAN node 511 and the AMF/MME 621 based, in part, on the IP protocol, supported by the IP 1061. The Internet Protocol layer (IP) 1061 may be used to perform packet addressing and routing functionality. In some implementations the IP layer 1061 may use point-to-point transmission to deliver and convey PDUs. In this regard, the RAN node 511 may comprise L2 and L1 layer communication links (e.g., wired or wireless) with the MME/AMF to exchange information.

In a second example, a user plane protocol stack may comprise, in order from highest layer to lowest layer, SDAP 1047, PDCP 1040, RLC 1030, MAC 1020, and PHY 1010. The user plane protocol stack may be used for communication between the UE 501, the RAN node 511, and UPF in NR implementations or an S-GW 622 and P-GW 623 in LTE implementations. In this example, upper layers 1051 may be built on top of the SDAP 1047, and may include a user datagram protocol (UDP) and IP security layer (UDP/IP) 1052, a General Packet Radio Service (GPRS) Tunneling Protocol for the user plane layer (GTP-U) 1053, and a User Plane PDU layer (UP PDU) 1063.

The transport network layer 1054 (also referred to as a "transport layer") may be built on IP transport, and the GTP-U 1053 may be used on top of the UDP/IP layer 1052 (comprising a UDP layer and IP layer) to carry user plane PDUs (UP-PDUs). The IP layer (also referred to as the "Internet layer") may be used to perform packet addressing and routing functionality. The IP layer may assign IP addresses to user data packets in any of IPv4, IPv6, or PPP formats, for example.

The GTP-U 1053 may be used for carrying user data within the GPRS core network and between the radio access network and the core network. The user data transported can be packets in any of IPv4, IPv6, or PPP formats, for example. The UDP/IP 1052 may provide checksums for data integrity, port numbers for addressing different functions at the source and destination and encryption and authentication on the selected data flows. The RAN node 511 and the S-GW 622 may utilize an S1-U interface to exchange user plane data via a protocol stack comprising an L1 layer (e.g., PHY 1010), an L2 layer (e.g., MAC 1020, RLC 1030, PDCP 1040, and/or SDAP 1047), the UDP/IP layer 1052, and the GTP-U 1053. The S-GW 622 and the P-GW 623 may utilize an S5/S8a interface to exchange user plane data via a protocol stack comprising an L1 layer, an L2 layer, the UDP/IP layer 1052, and the GTP-U 1053. As discussed previously, NAS protocols may support the mobility of the UE 501 and the session management procedures to establish and maintain IP connectivity between the UE 501 and the P-GW 623.

Moreover, although not shown by FIG. 10, an application layer may be present above the AP 1063 and/or the transport network layer 1054. The application layer may be a layer in which a user of the UE 501, RAN node 511, or other network element interacts with software applications being executed, for example, by application circuitry 705 or application circuitry 805, respectively. The application layer may also provide one or more interfaces for software applications to interact with communications systems of the UE 501 or RAN node 511, such as the baseband circuitry 910. In some implementations the IP layer and/or the application layer may provide the same or similar functionality as layers 5-7, or portions thereof, of the Open Systems Interconnection (OSI) model (e.g., OSI Layer 7—the application layer, OSI Layer 6—the presentation layer, and OSI Layer 5—the session layer).

Figure 11:
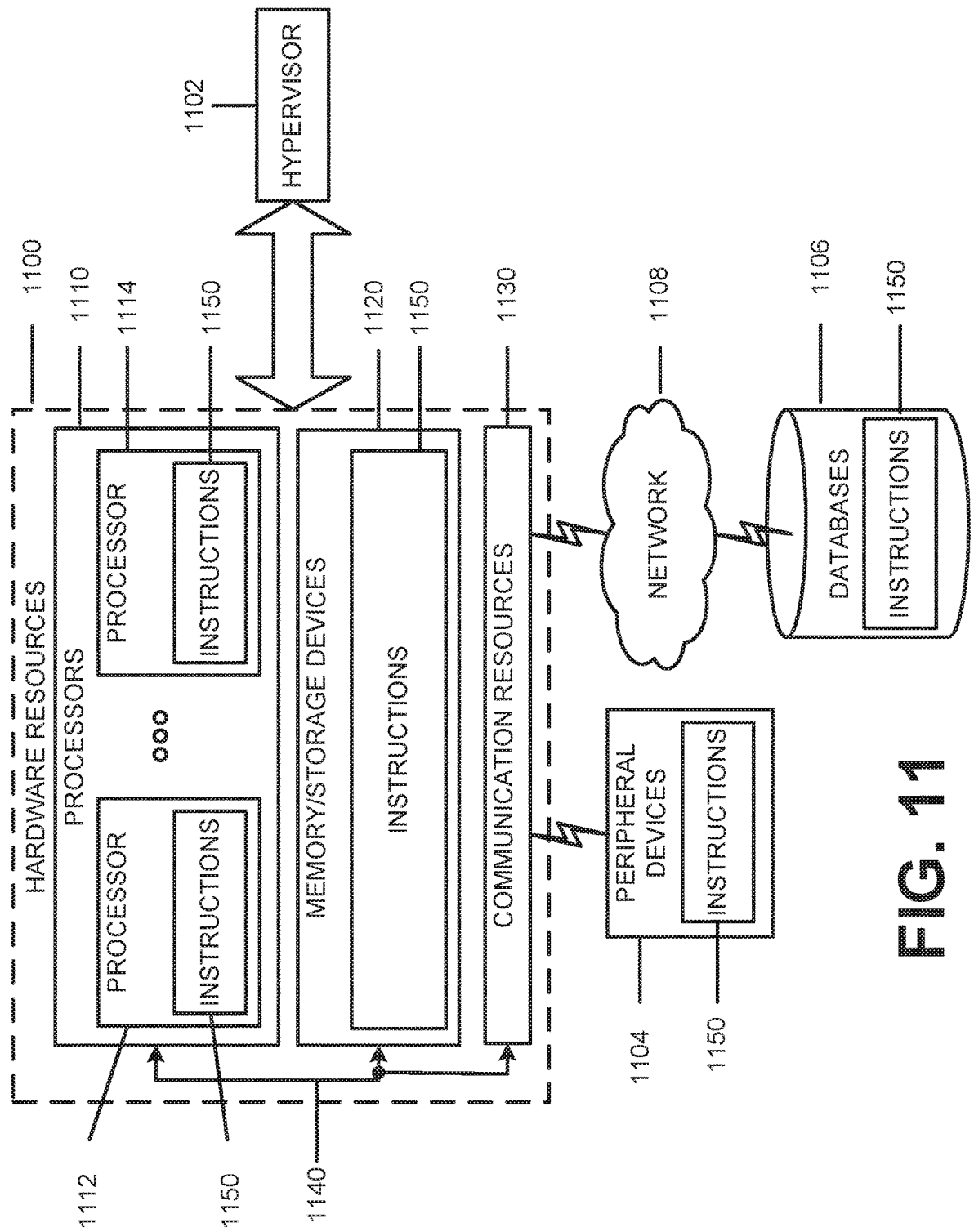
FIG. 11 is a block diagram illustrating components able to read instructions from a machine-readable or computer-readable medium (e.g., a non-transitory machine-readable storage medium) and perform any one or more of the methodologies described herein, according to some implementations of the present disclosure.

FIG. 11 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 11 shows a diagrammatic representation of hardware resources 1100 including one or more processors (or processor cores) 1110, one or more memory/storage devices 1120, and one or more communication resources 1130, each of which may be communicatively coupled via a bus 1140. For embodiments where node virtualization (e.g., NFV) is utilized, a hypervisor 1102 may be executed to provide an execution environment for one or more network slices/sub-slices to utilize the hardware resources 1100.

The processors 1110 may include, for example, a processor 1112 and a processor 1114. The processor(s) 1110 may be, for example, a central processing unit (CPU), a reduced instruction set computing (RISC) processor, a complex instruction set computing (CISC) processor, a graphics processing unit (GPU), a DSP such as a baseband processor, an ASIC, an FPGA, a radio-frequency integrated circuit (RFIC), another processor (including those discussed herein), or any suitable combination thereof.

The memory/storage devices 1120 may include main memory, disk storage, or any suitable combination thereof. The memory/storage devices 1120 may include, but are not limited to, any type of volatile or nonvolatile memory such as dynamic random access memory (DRAM), static random access memory (SRAM), erasable programmable read-only memory (EPROM), electrically erasable programmable read-only memory (EEPROM), Flash memory, solid-state storage, etc.

The communication resources 1130 may include interconnection or network interface components or other suitable devices to communicate with one or more peripheral devices 1104 or one or more databases 1106 via a network 1108. For example, the communication resources 1130 may include wired communication components (e.g., for coupling via USB), cellular communication components, NFC components, Bluetooth® (or Bluetooth® Low Energy) components, Wi-Fi® components, and other communication components.

Instructions 1150 may comprise software, a program, an application, an applet, an app, or other executable code for causing at least any of the processors 1110 to perform any one or more of the methodologies discussed herein. The instructions 1150 may reside, completely or partially, within at least one of the processors 1110 (e.g., within the processor's cache memory), the memory/storage devices 1120, or any suitable combination thereof. Furthermore, any portion of the instructions 1150 may be transferred to the hardware resources 1100 from any combination of the peripheral devices 1104 or the databases 1106. Accordingly, the memory of processors 1110, the memory/storage devices 1120, the peripheral devices 1104, and the databases 1106 are examples of computer-readable and machine-readable media.

What is claimed is:

1. In an integrated access and backhaul (IAB) network that includes a plurality of IAB nodes, a method for establishing a data path between an access IAB node that serves a user equipment (UE) and a donor IAB node, the method comprising:

selecting a subset of the plurality of IAB nodes to establish the data path, wherein the subset of IAB nodes includes the access IAB node and one or more intermediate nodes that link the access IAB node to the donor IAB node, and wherein the one or more intermediate nodes include a final intermediate IAB node that is communicatively coupled to the donor IAB node via a donor-node backhaul link bearer;

establishing an access link UE bearer that communicatively couples the UE to the access IAB node;

establishing respective backhaul link bearers between the subset of IAB nodes; and mapping a final one of the respective backhaul link bearers to the donor-node backhaul link bearer, thereby establishing the data path between the access IAB node and the donor IAB node;

wherein the subset of IAB nodes includes pairs of IAB nodes that have a parent-child relationship, and wherein establishing respective backhaul link bearers between the subset of IAB nodes comprises:

updating respective IAB context information of parent IAB nodes of the subset to include the respective backhaul link bearers;

transmitting to the parent IAB nodes respective F1 interface control (F1-C) messages comprising the respective updated IAB context information and identifiers of the respective pairs of IAB nodes; and transmitting to child IAB nodes of the subset respective configuration messages indicative of updated UE context information.

2. The method of claim 1, wherein the respective backhaul link bearers include 1:1 UE bearer to backhaul link mapping.

3. The method of claim 1, wherein mapping the final one of the respective backhaul link bearers to the donor-node backhaul link bearer comprises a N:1 UE bearer to backhaul link mapping.

4. The method of claim 1, wherein establishing the access link UE bearer that communicatively couples the UE to the access IAB node comprises:

updating UE context information to include the access link UE bearer;

transmitting to the access IAB node an F1 interface control (F1-C) message indicative of the updated UE context information; and transmitting to the UE a configuration message indicative of the updated UE context information.

5. The method of claim 4, wherein the configuration message is an RRCReconfiguration message, and wherein the configuration message is transmitted to the UE using radio resource control (RRC) signaling.

6. The method of claim 1, wherein the respective configuration messages are RRCReconfiguration messages, and wherein the respective configuration messages are transmitted to the child IAB nodes using radio resource control (RRC) signaling.

7. The method of claim 1, wherein mapping the final one of the respective backhaul link bearers to the donor-node backhaul link bearer comprises: transmitting to the final intermediate IAB node a second configuration message that maps the final one of the respective backhaul link bearers to the donor-node backhaul link bearer.

8. The method of claim 7, wherein the second configuration message is an RRCReconfiguration message, and wherein the second configuration message is transmitted to the final intermediate IAB node using radio resource control (RRC) signaling.

9. The method of claim 1, wherein the final one of the respective backhaul link bearers communicatively couples the final intermediate IAB node to a child IAB node of the final intermediate IAB node.

10. In an integrated access and backhaul (IAB) network that includes a plurality of IAB nodes, a non-transitory computer-readable storage device having stored thereon instructions, which, when executed by a data processing apparatus, cause the data processing apparatus to perform operations for establishing a data path between an access IAB node that serves a user equipment (UE) and a donor IAB node, the operations comprising:

selecting a subset of the plurality of IAB nodes to establish the data path, wherein the subset of IAB nodes includes the access IAB node and one or more intermediate nodes that link the access IAB node to the donor IAB node, and wherein the one or more intermediate nodes include a final intermediate IAB node that is communicatively coupled to the donor IAB node via a donor-node backhaul link bearer;

establishing an access link UE bearer that communicatively couples the UE to the access IAB node;

establishing respective backhaul link bearers between the subset of IAB nodes; and mapping a final one of the respective backhaul link bearers to the donor-node backhaul link bearer, thereby establishing the data path between the access IAB node and the donor IAB node;

wherein the subset of IAB nodes includes pairs of IAB nodes that have a parent-child relationship, and wherein establishing respective backhaul link bearers between the subset of IAB nodes comprises:

updating respective IAB context information of parent IAB nodes of the subset to include the respective backhaul link bearers;

transmitting to the parent IAB nodes respective F1 interface control (F1-C) messages comprising the respective updated IAB context information and identifiers of the respective pairs of IAB nodes; and transmitting to child IAB nodes of the subset respective configuration messages indicative of updated UE context information.

11. The non-transitory computer-readable storage device of claim 10, wherein the respective backhaul link bearers involve 1:1 UE bearer to backhaul link mapping.

12. The non-transitory computer-readable storage device of claim 10, wherein mapping the final one of the respective backhaul link bearers to the donor-node backhaul link bearer involves a N:1 UE bearer to backhaul link mapping.

13. The non-transitory computer-readable storage device of claim 10, wherein establishing the access link UE bearer that communicatively couples the UE to the access IAB node comprises:

updating UE context information to include the access link UE bearer;

transmitting to the access IAB node an F1 interface control (F1-C) message indicative of the updated UE context information; and transmitting to the UE a configuration message indicative of the updated UE context information.

14. The non-transitory computer-readable storage device of claim 13, wherein the configuration message is an RRCReconfiguration message, and wherein the configuration message is transmitted to the UE using radio resource control (RRC) signaling.

15. The non-transitory computer-readable storage device of claim 10, wherein the respective configuration messages are RRCReconfiguration messages, and wherein the respective configuration messages are transmitted to the child IAB nodes using radio resource control (RRC) signaling.

16. The non-transitory computer-readable storage device of claim 10, wherein mapping the final one of the respective backhaul link bearers to the donor-node backhaul link bearer comprises:

transmitting to the final intermediate IAB node a configuration message that maps the final one of the respective backhaul link bearers to the donor-node backhaul link bearer.

17. The non-transitory computer-readable storage device of claim 16, wherein the configuration message is an RRCReconfiguration message, and wherein the configuration message is transmitted to the final intermediate IAB node using radio resource control (RRC) signaling.

18. An integrated access and backhaul (IAB) system comprising:
   a plurality of IAB nodes; and
   one or more processors and one or more storage devices storing instructions that are operable, when executed by the one or more processors, to cause the one or more processors to perform operations for establishing a data path between an access IAB node that serves a user equipment (UE) and a donor IAB node, the operations comprising:
      selecting a subset of the plurality of IAB nodes to establish the data path, wherein the subset of IAB nodes includes the access IAB node and one or more intermediate nodes that link the access IAB node to the donor IAB node, and wherein the one or more intermediate nodes include a final intermediate node that is communicatively coupled to the donor IAB node via a donor-node backhaul link bearer;
      establishing an access link UE bearer that communicatively couples the UE to the access IAB node;
      establishing respective backhaul link bearers between the subset of IAB nodes; and
   mapping a final one of the respective backhaul link bearers to the donor-node backhaul link bearer, thereby establishing the data path between the access IAB node and the donor IAB node;
   wherein the subset of IAB nodes includes pairs of IAB nodes that have a parent-child relationship, and wherein establishing respective backhaul link bearers between the subset of IAB nodes comprises:
      updating respective IAB context information of parent IAB nodes of the subset to include the respective backhaul link bearers;
      transmitting to the parent IAB nodes respective F1 interface control (F1-C) messages comprising the respective updated IAB context information and identifiers of the respective pairs of IAB nodes; and
      transmitting to child IAB nodes of the subset respective configuration messages indicative of updated UE context information.

* * * * *